US008235289B2

(12) United States Patent  
Hsu et al.

(10) Patent No.: US 8,235,289 B2  
(45) Date of Patent: Aug. 7, 2012

(54) POINT OF SALE TERMINAL FOR ENGAGEMENT WITH A MOBILE COMMUNICATOR

(75) Inventors: Shin-An Hsu, Taoyuan (TW); Chi-Jung Luo, Taipei (TW)

(73) Assignee: Verifone, Inc., San Jose, CA (US)

( * ) Notice: Subject to any disclaimer, the term of this patent is extended or adjusted under 35 U.S.C. 154(b) by 40 days.

(21) Appl. No.: 12/977,807

(22) Filed: Dec. 23, 2010

(65) Prior Publication Data  
US 2012/0160907 A1 Jun. 28, 2012

(51) Int. Cl.  
*G06K 15/00* (2006.01)
(52) U.S. Cl. ..................... 235/383; 455/575.8
(58) Field of Classification Search .................. 235/375, 235/383; 455/575.8  
See application file for complete search history.

(56) References Cited

U.S. PATENT DOCUMENTS

| | | | |
|---|---|---|---|
| 5,694,468 A | 12/1997 | Hsu | |
| 5,825,874 A | 10/1998 | Humphreys et al. | |
| 6,002,765 A | 12/1999 | Frank | |
| 6,405,049 B2* | 6/2002 | Herrod et al. | 455/517 |
| 7,941,197 B2* | 5/2011 | Jain et al. | 455/575.8 |
| 2002/0009194 A1 | 1/2002 | Wong et al. | |
| 2002/0042743 A1* | 4/2002 | Ortiz et al. | 705/14 |
| 2002/0176571 A1 | 11/2002 | Louh | |
| 2003/0013500 A1 | 1/2003 | Dunoff et al. | |
| 2003/0181168 A1* | 9/2003 | Herrod et al. | 455/90.3 |
| 2004/0204166 A1 | 10/2004 | Bae | |
| 2004/0235533 A1 | 11/2004 | Bae | |
| 2011/0177852 A1* | 7/2011 | Jain et al. | 455/575.8 |
| 2011/0187642 A1* | 8/2011 | Faith et al. | 345/158 |

* cited by examiner

Primary Examiner — Daniel Hess  
(74) Attorney, Agent, or Firm — Sughrue Mion, PLLC

(57) ABSTRACT

A point of sale terminal including a housing including at least first and second housing portions which are arranged for relative axial movement from a closed position to an open position, the first housing portion including at least a communications interface adapted for operative communications engagement with a mobile communicator and a first housing portion socket adapted for partially surrounding the mobile communicator, the second housing portion including a second housing portion socket adapted for partially surrounding the mobile communicator and the first and second housing portions being configured such that when they are arranged in the closed position the first housing portion socket and the second housing portion socket together hug the mobile communicator and prevent unwanted disengagement of the mobile communicator therefrom.

18 Claims, 32 Drawing Sheets

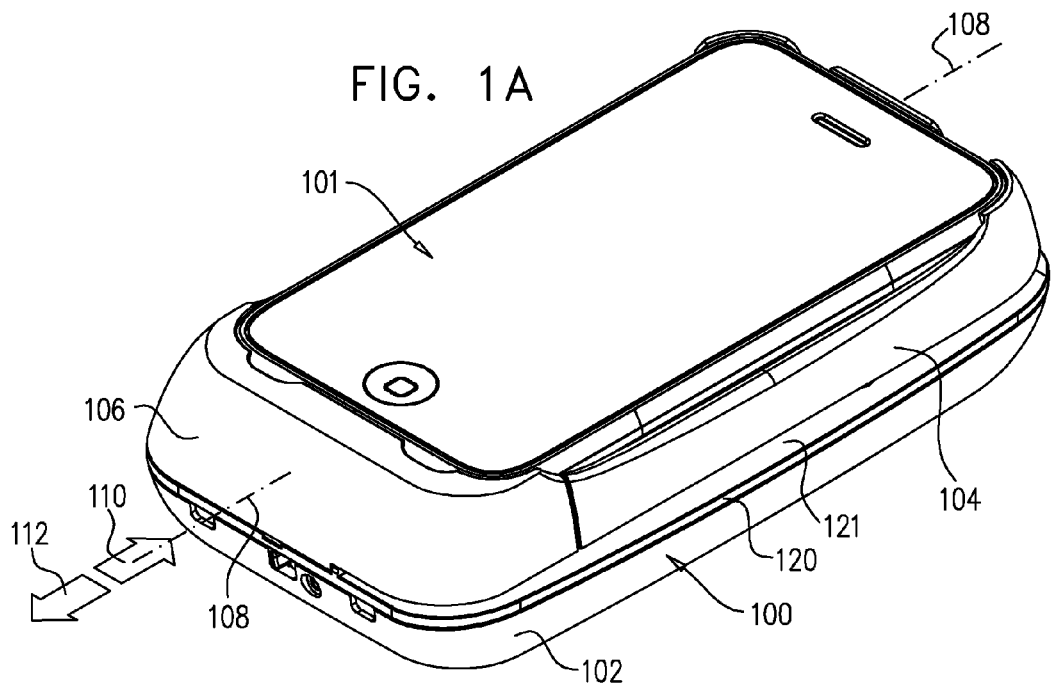
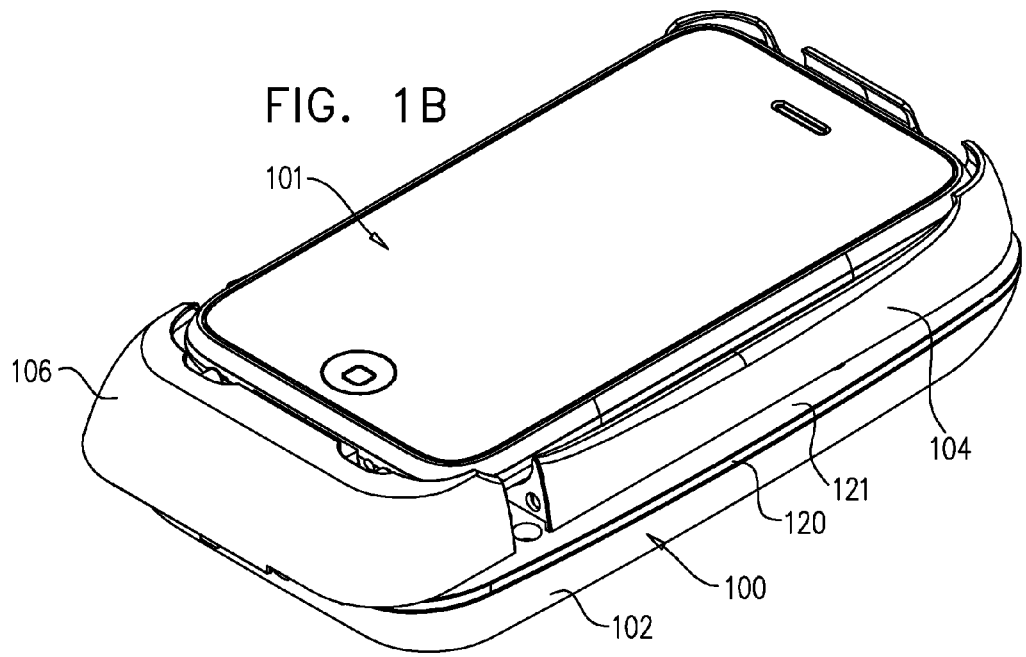

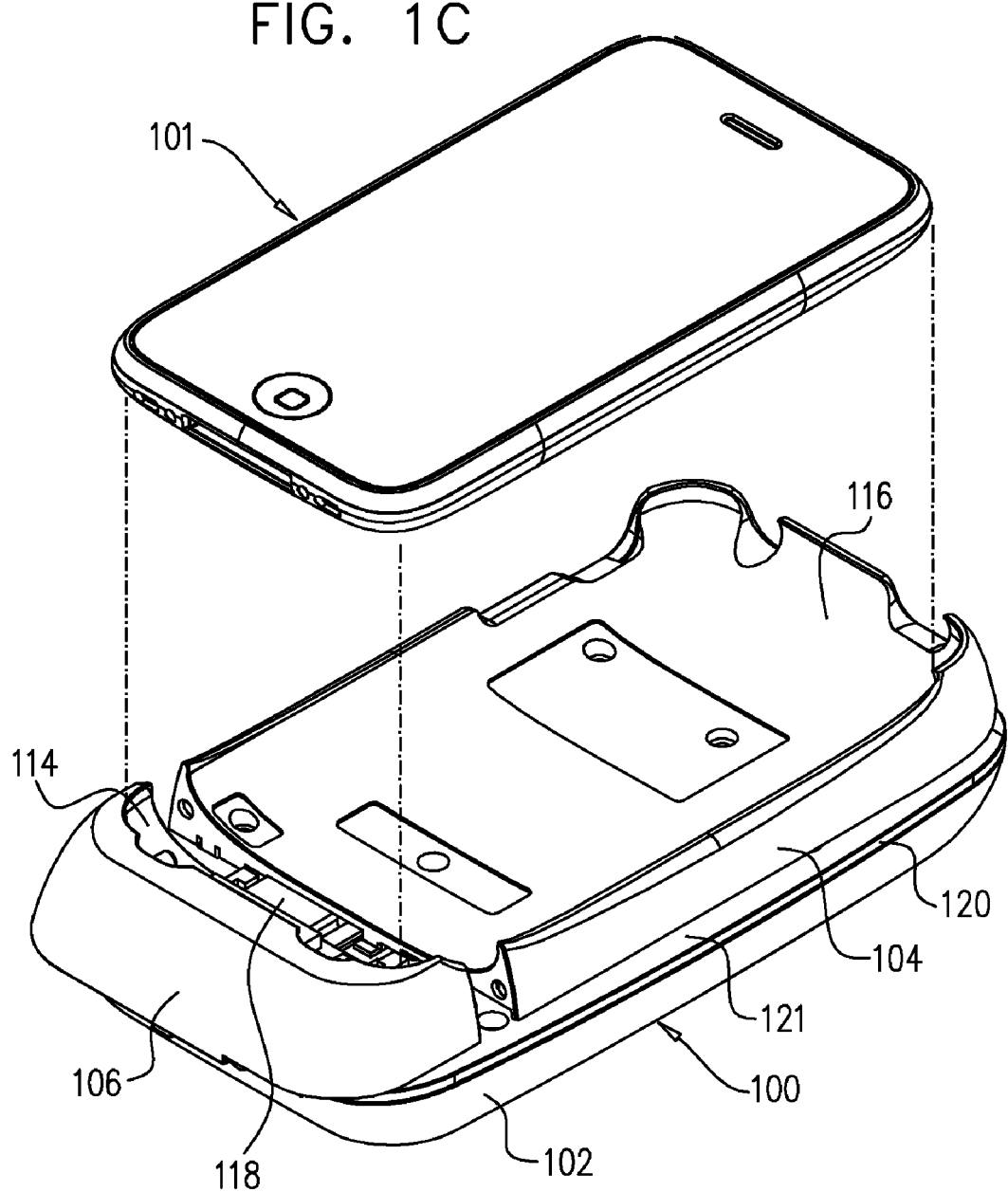

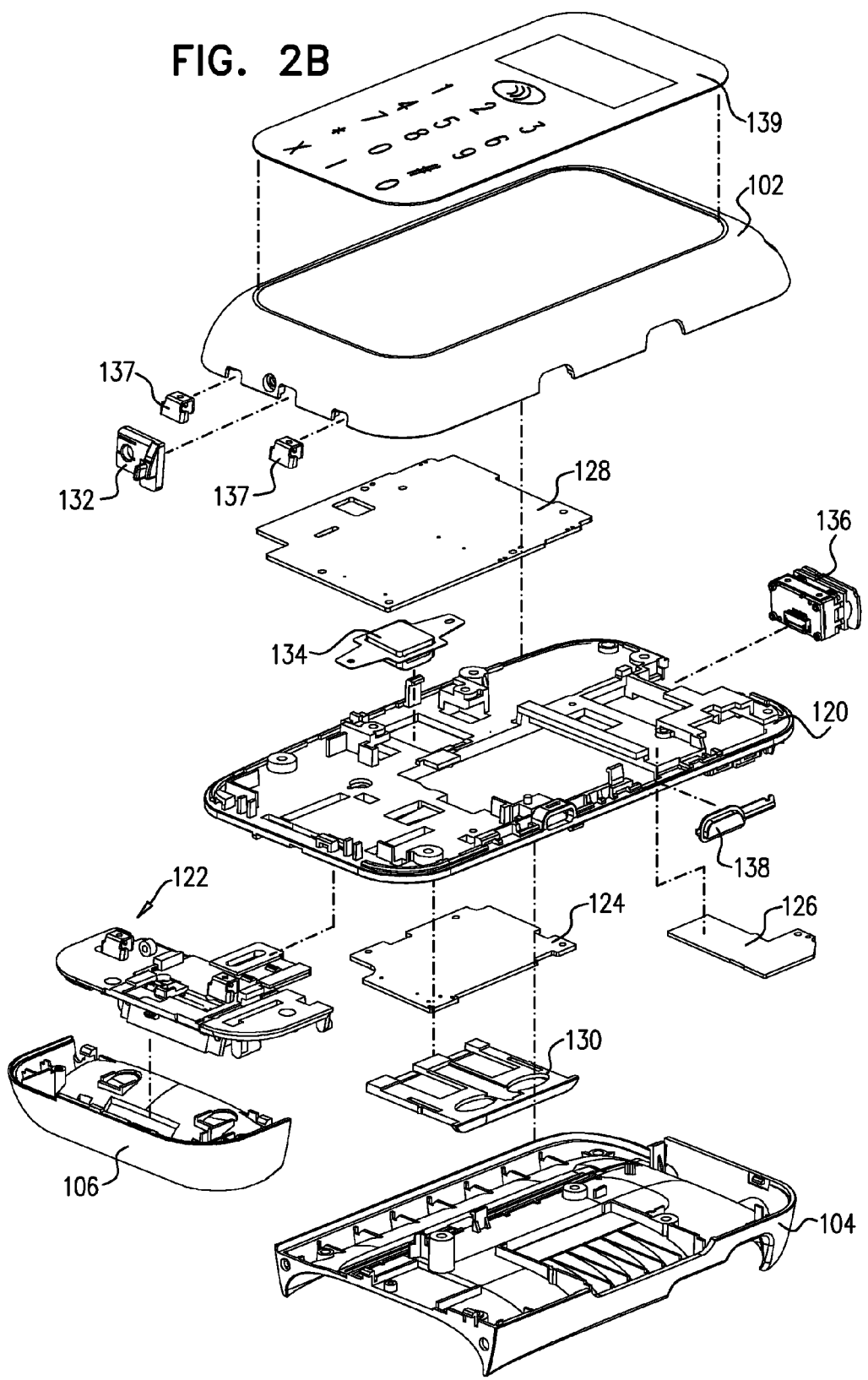

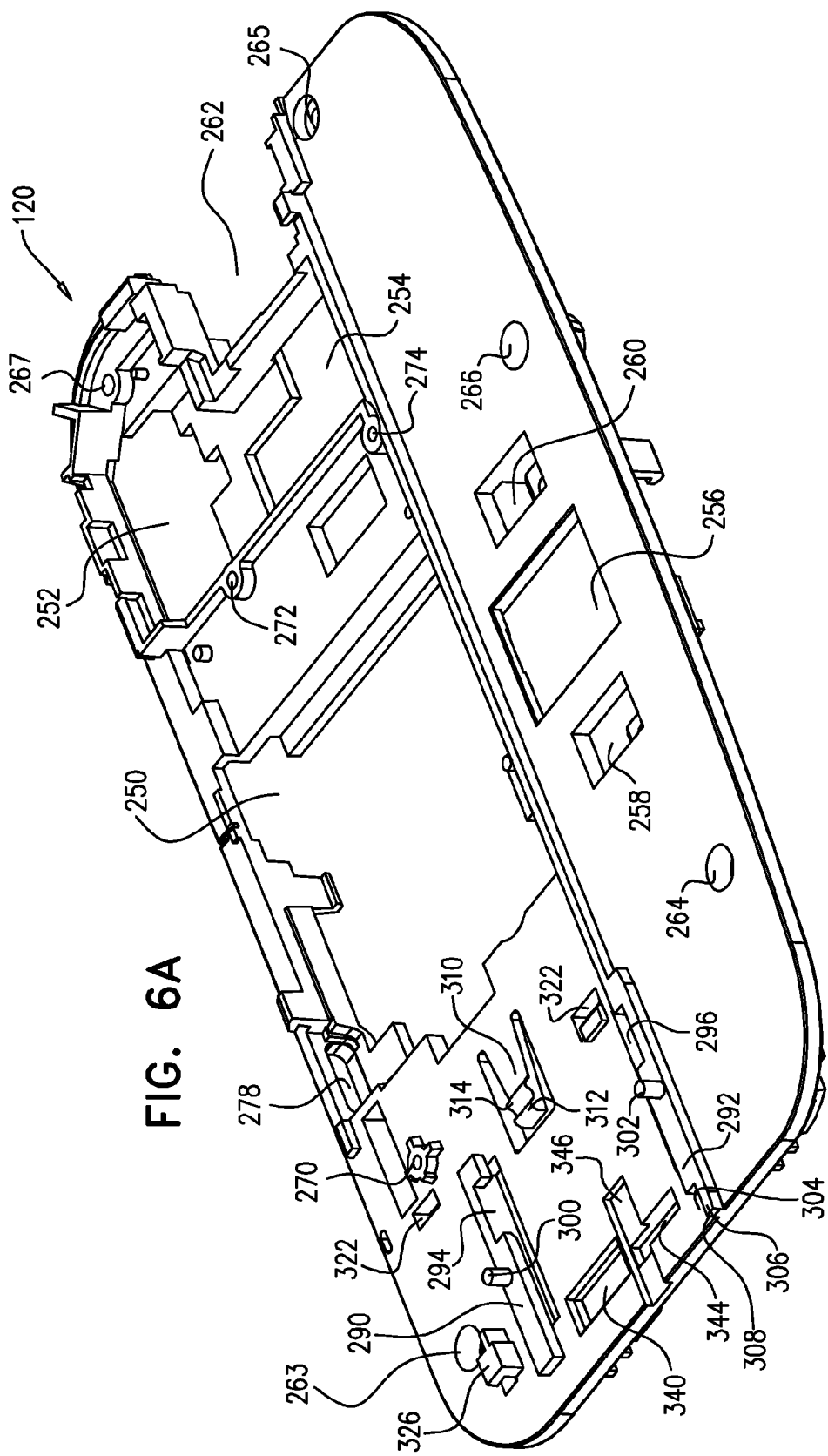

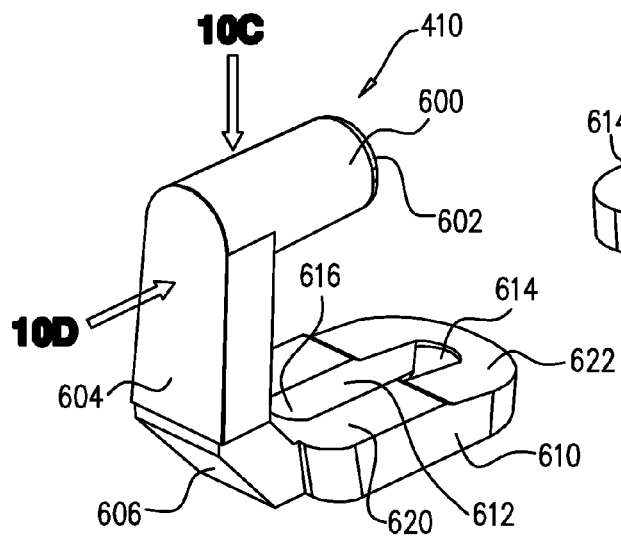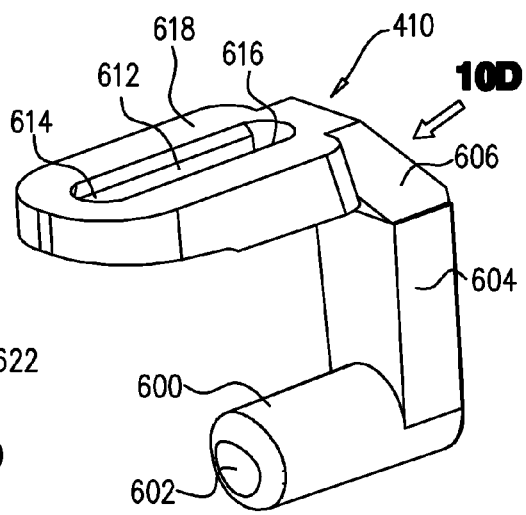
FIG. 10A  FIG. 10B
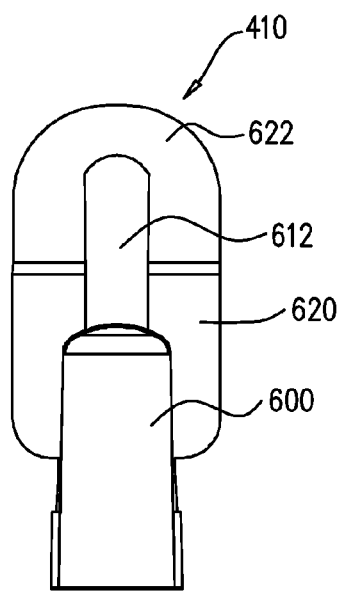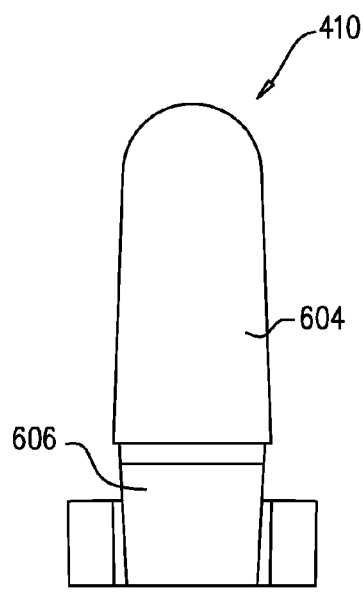
FIG. 10C  FIG. 10D

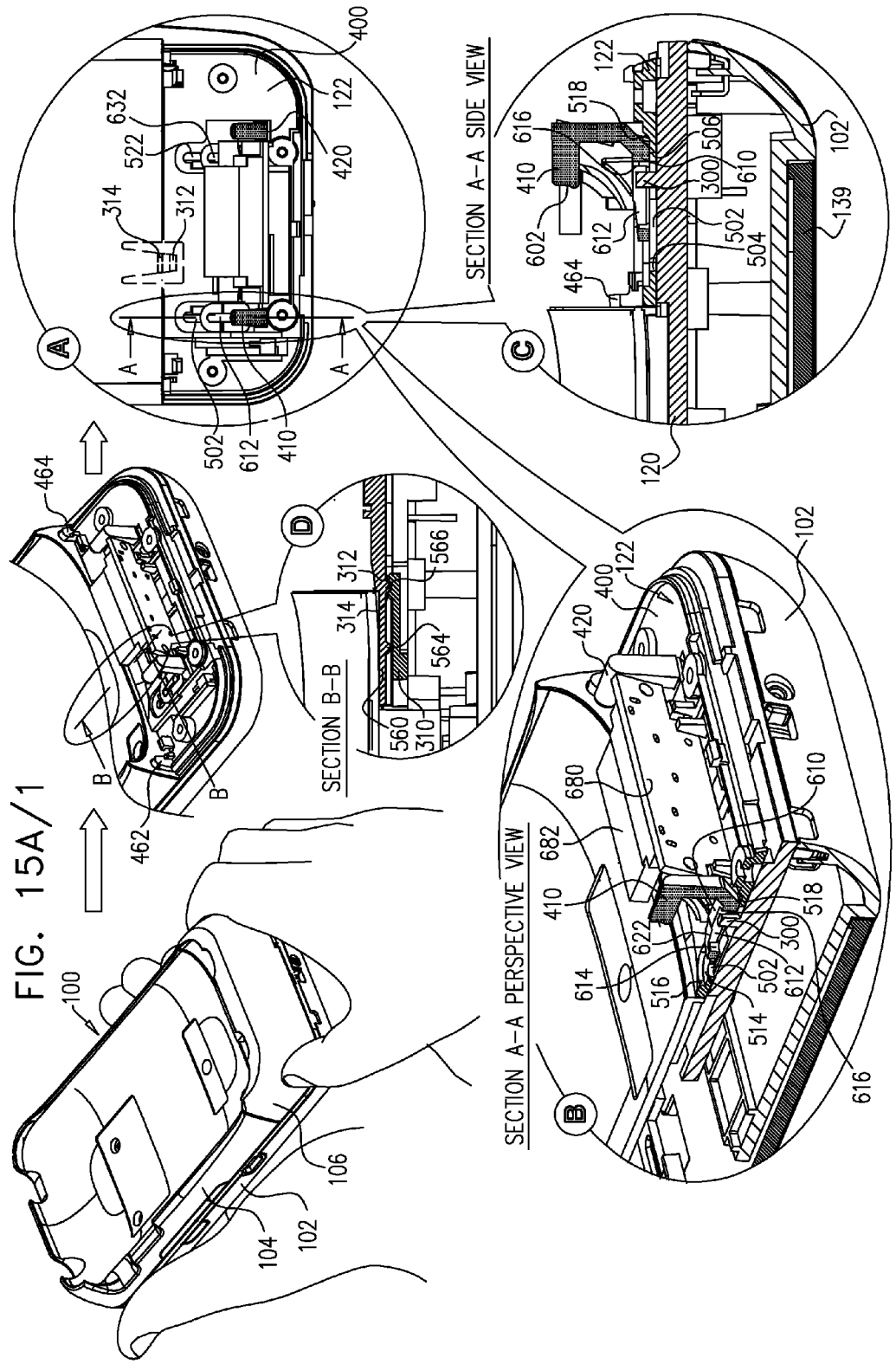

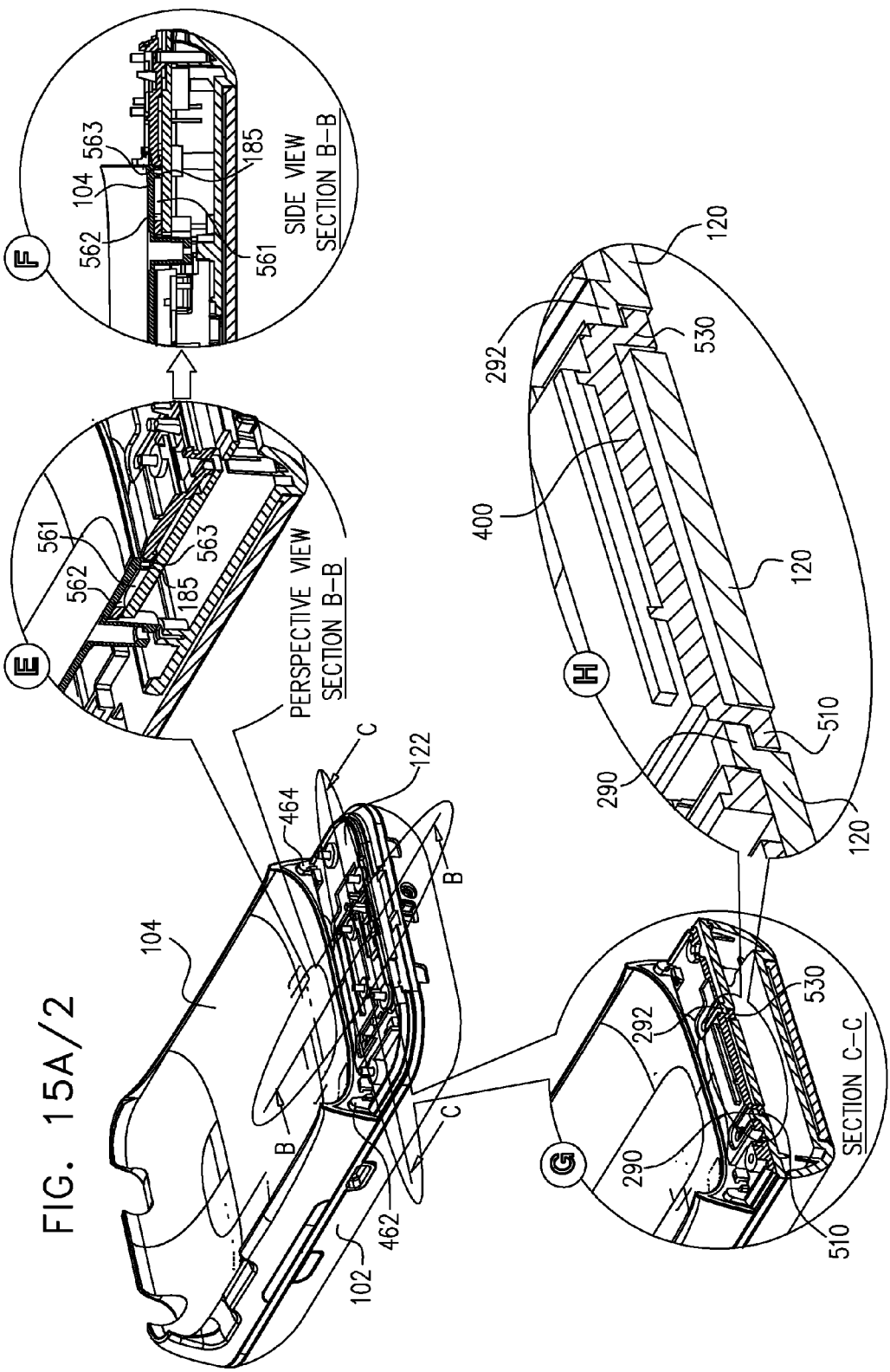

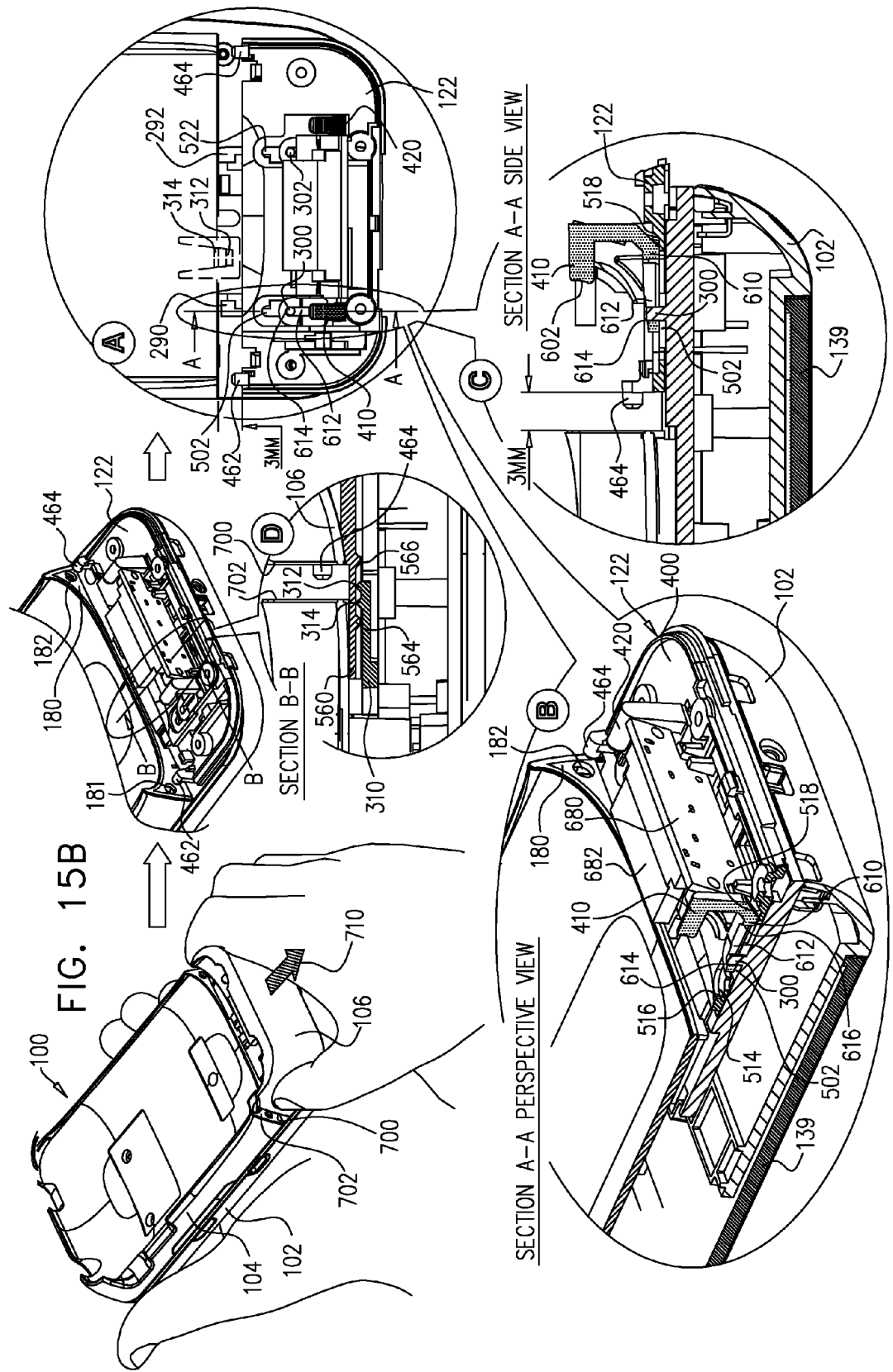

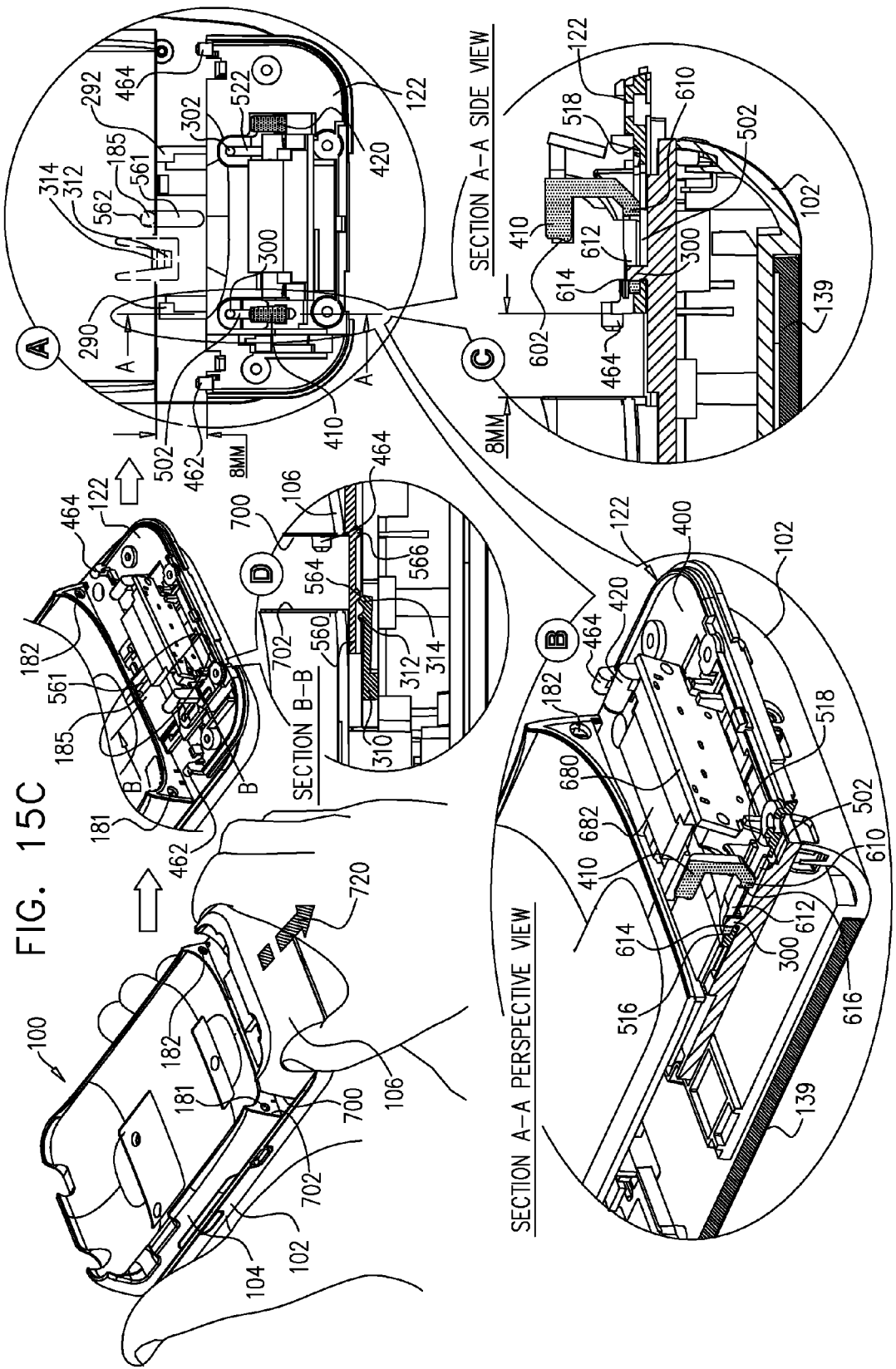

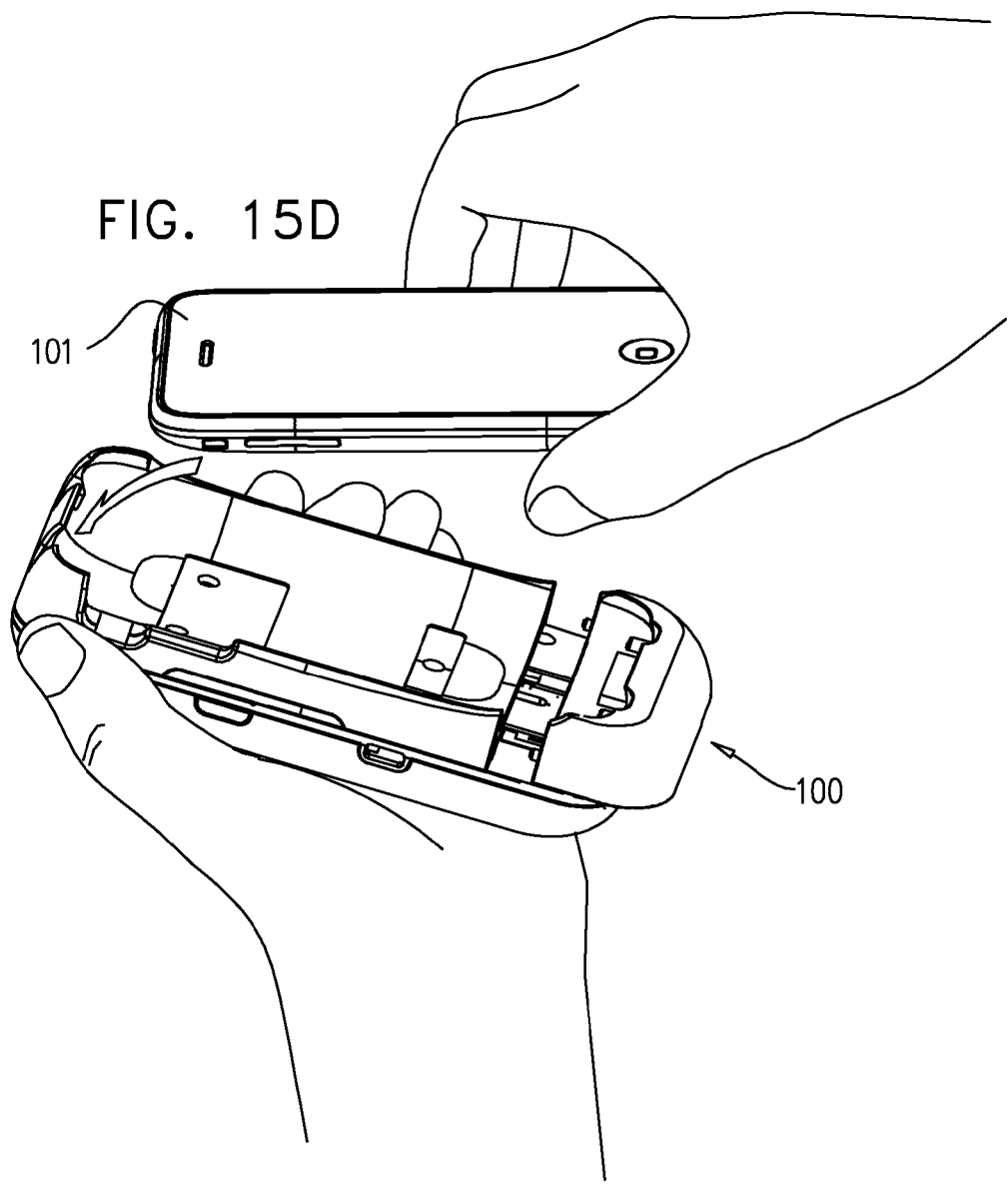

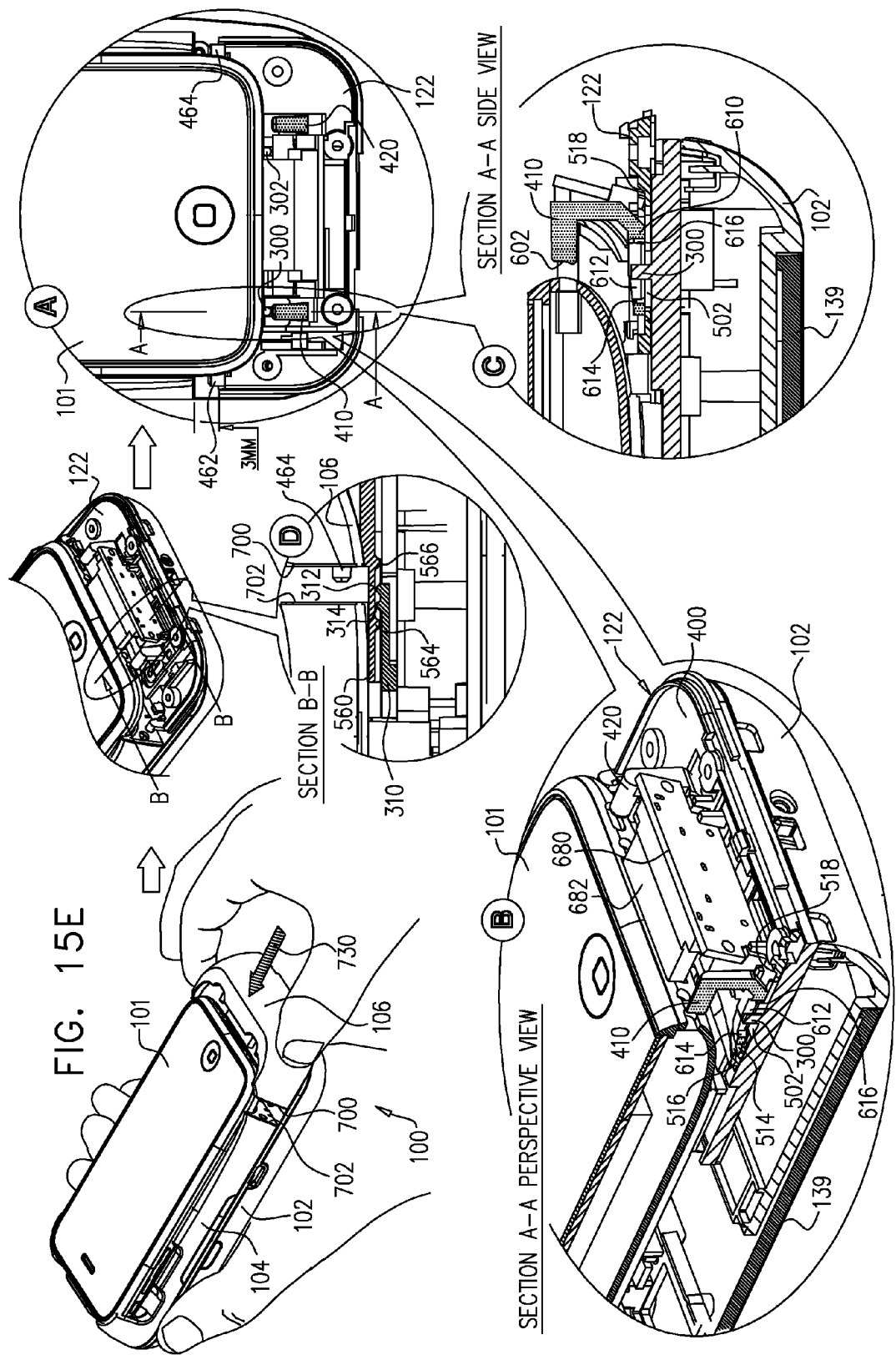

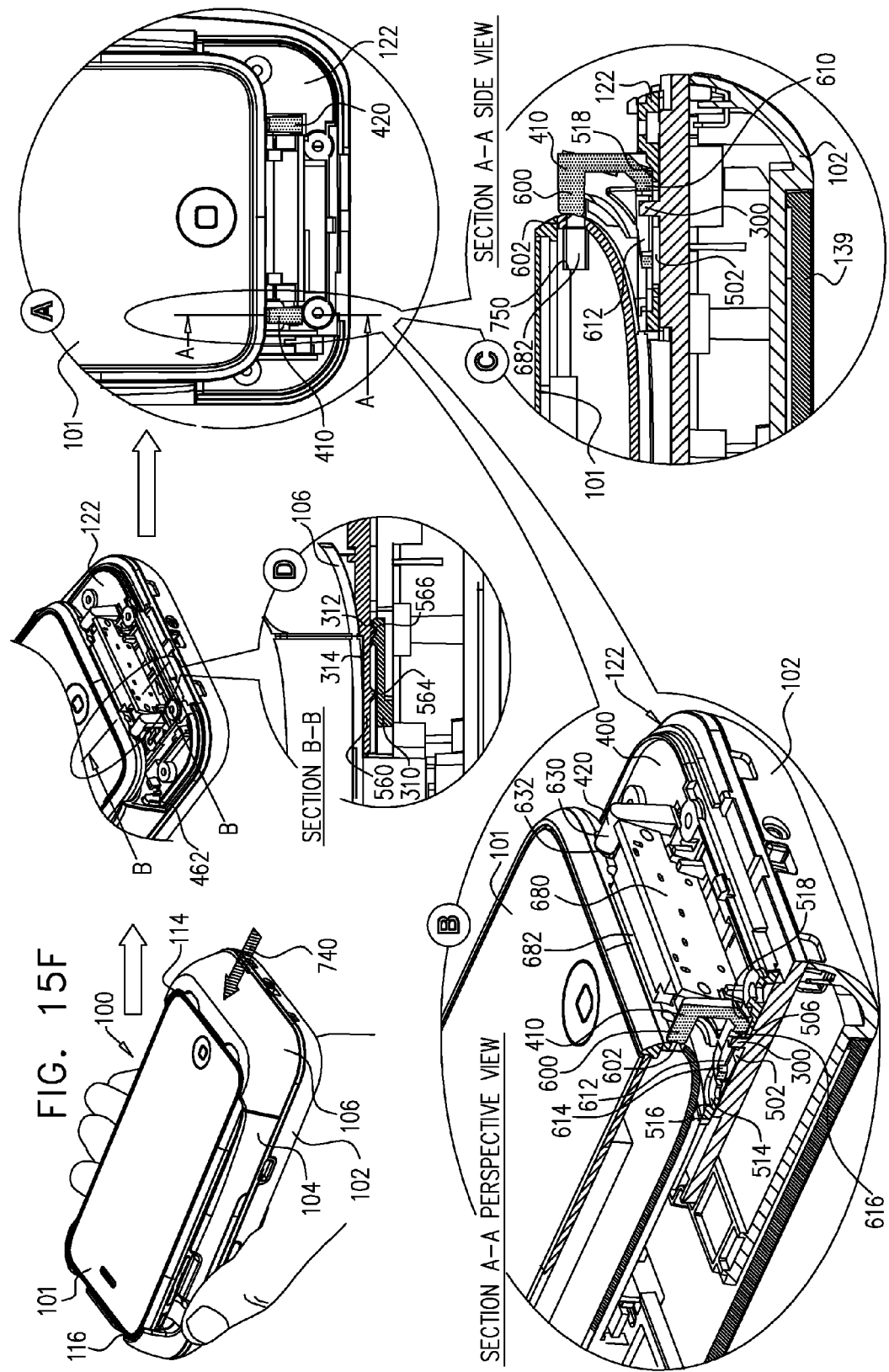

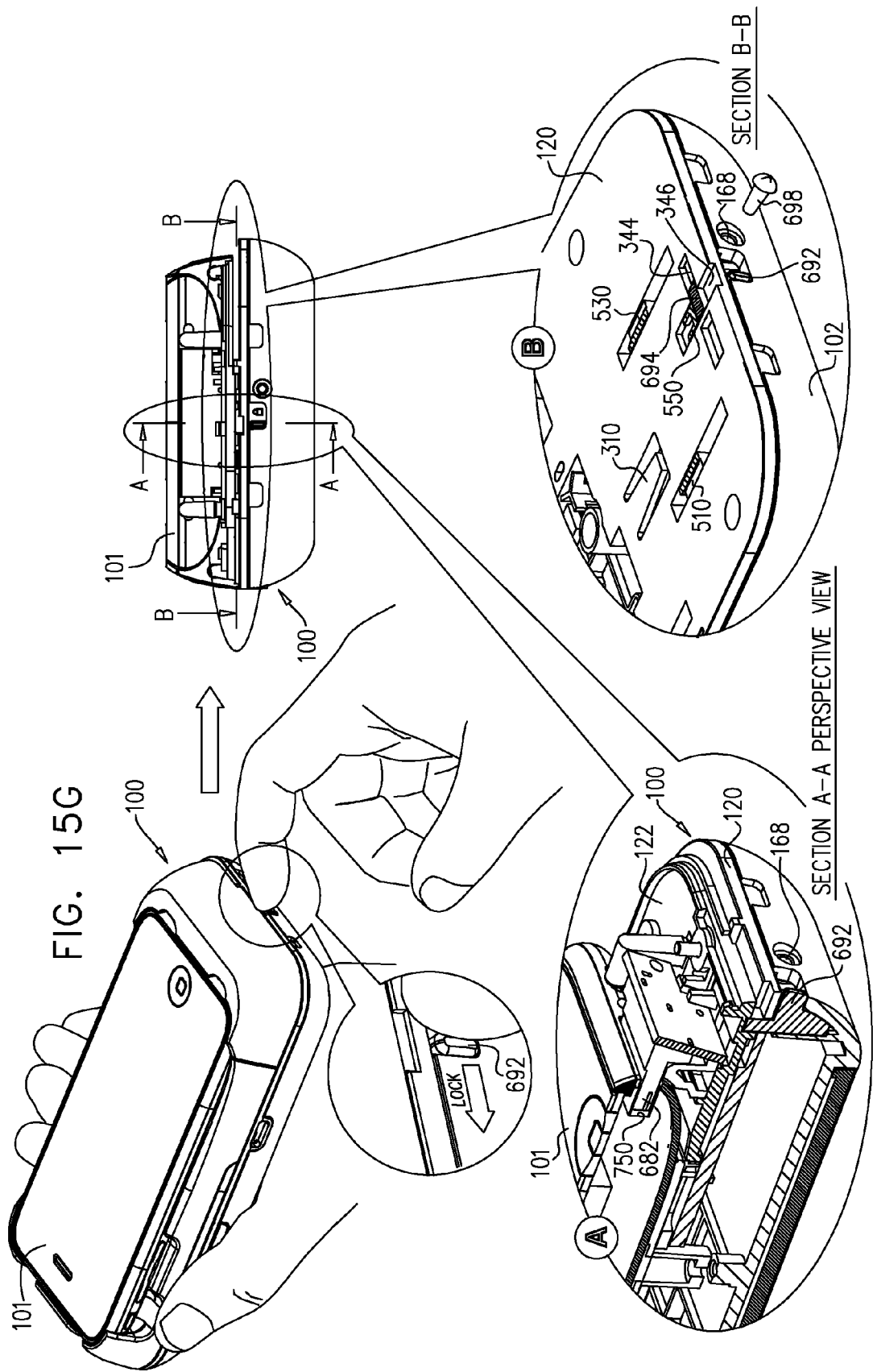

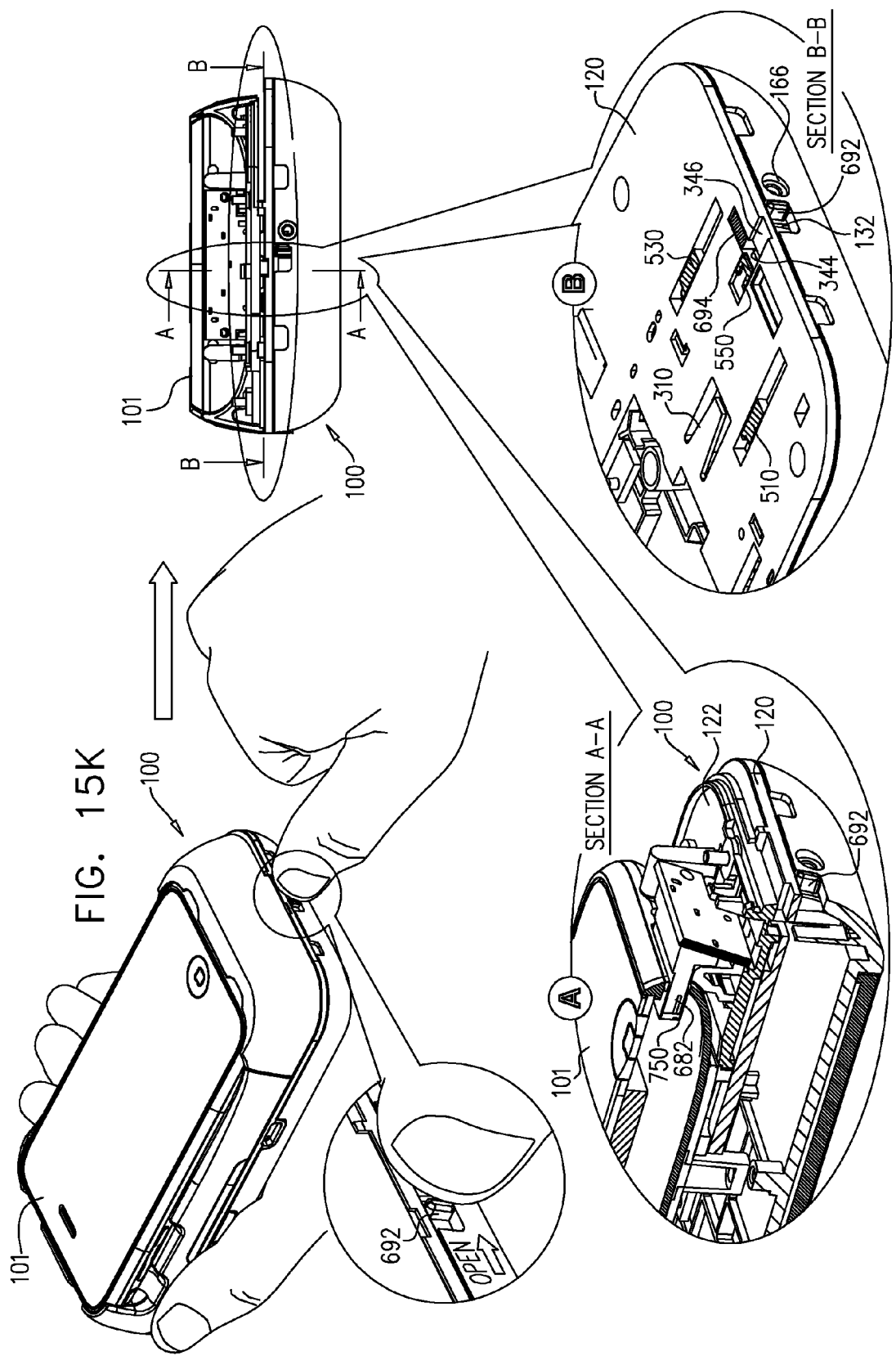

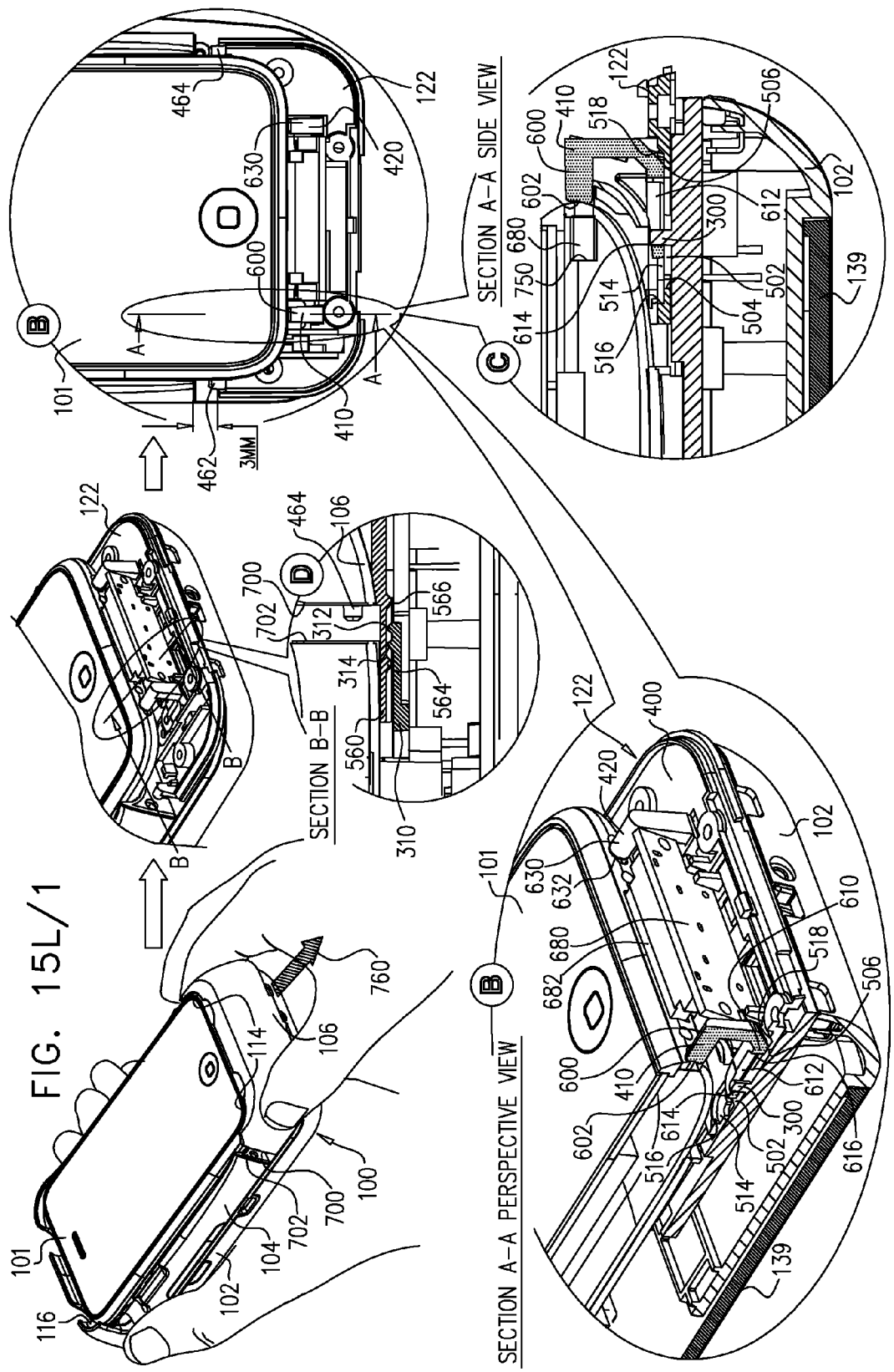

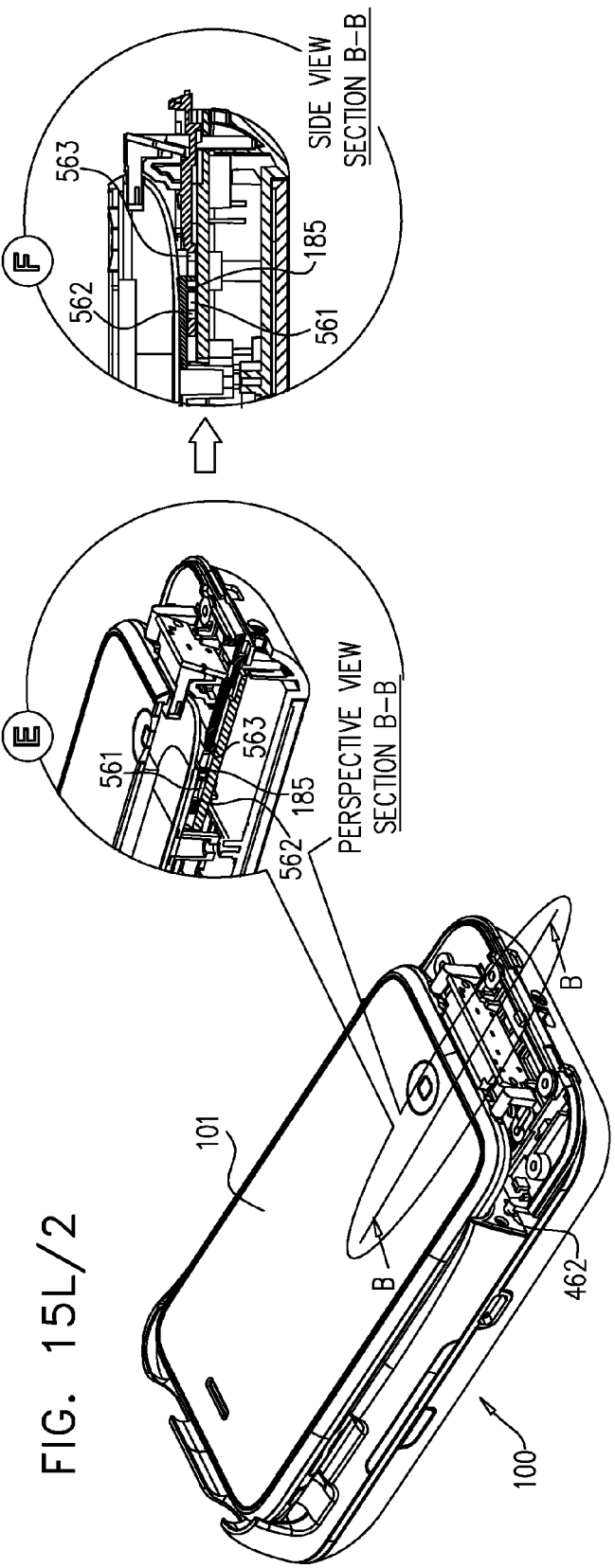

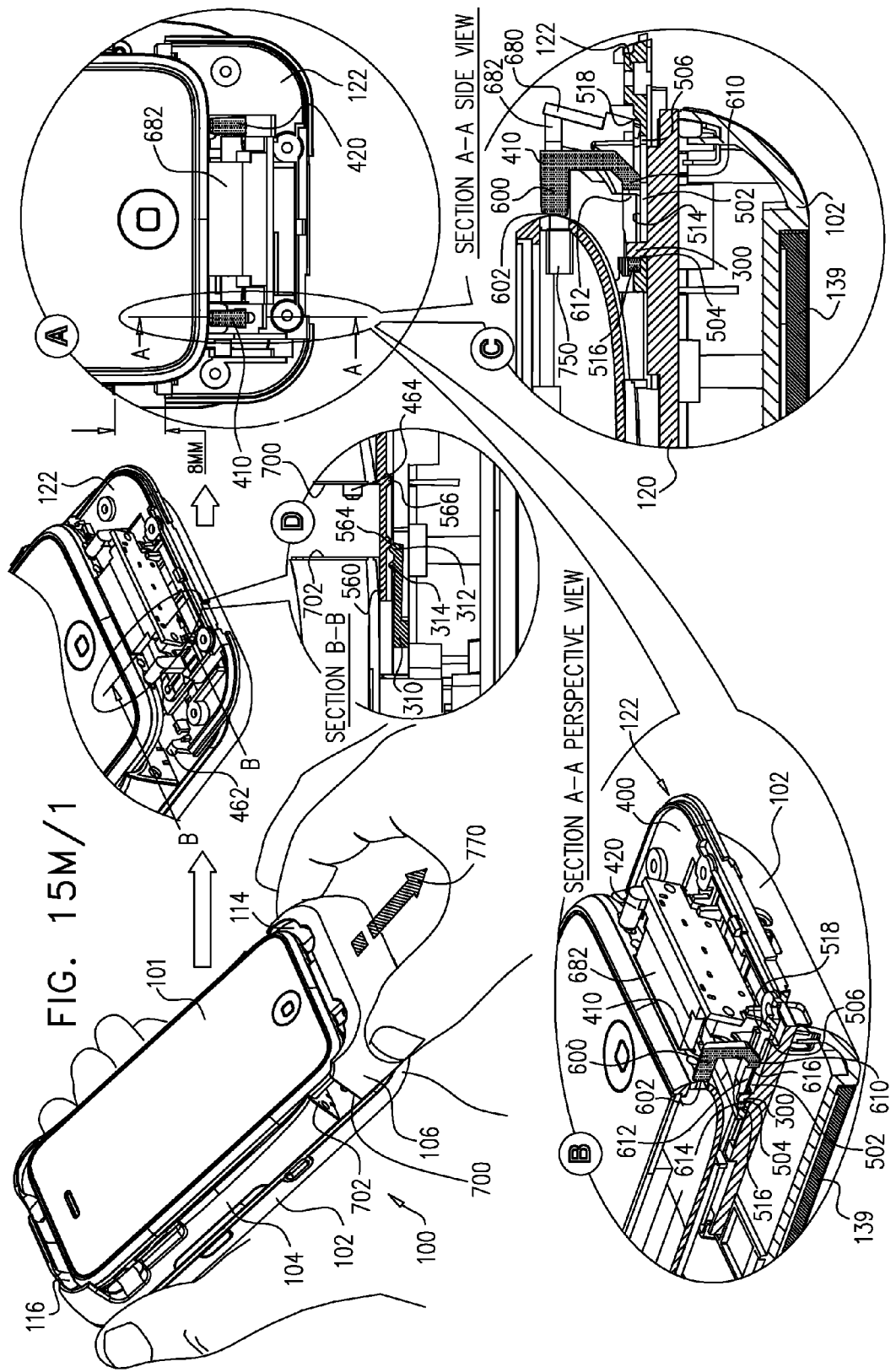
FIG. 15M/1

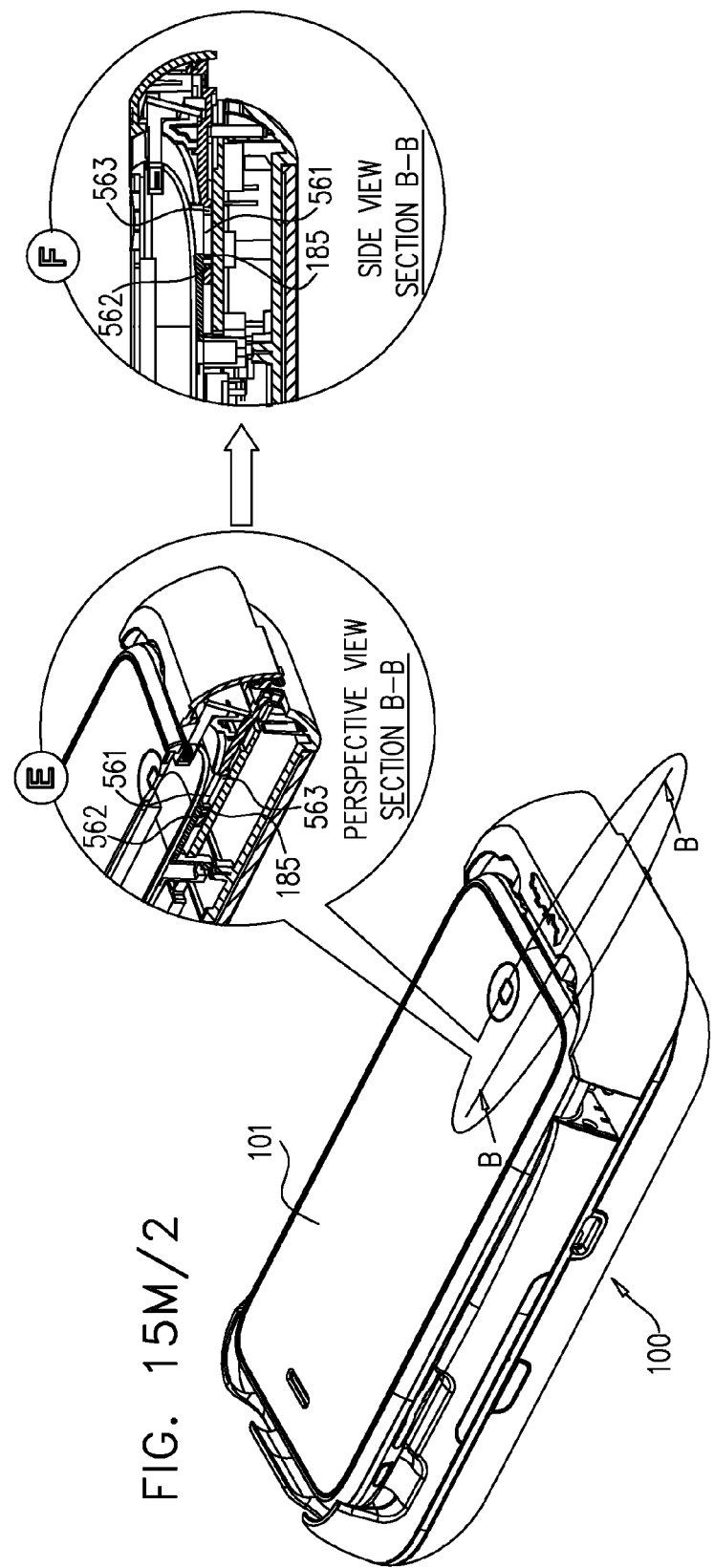

POINT OF SALE TERMINAL FOR ENGAGEMENT WITH A MOBILE COMMUNICATOR

FIELD OF THE INVENTION

The present invention relates to point of sale terminals generally.

BACKGROUND OF THE INVENTION

The following patent publications are believed to represent the current state of the art:

U.S. Pat. Nos. 5,694,468; 5,825,874 and 6,002,765; and
U.S. Patent Publication Nos. 2002/0009194; 2002/0176571; 2003/0013500; 2004/0204166 and 2004/0235533.

SUMMARY OF THE INVENTION

The present invention seeks to provide a point of sale terminal having improved functionality. There is thus provided in accordance with a preferred embodiment of the present invention a point of sale terminal including a housing including at least first and second housing portions which are arranged for relative axial movement from a closed position to an open position, the first housing portion including at least a communications interface adapted for operative communications engagement with a mobile communicator and a first housing portion socket adapted for partially surrounding the mobile communicator, the second housing portion including a second housing portion socket adapted for partially surrounding the mobile communicator and the first and second housing portions being configured such that when they are arranged in the closed position the first housing portion socket and the second housing portion socket together hug the mobile communicator and prevent unwanted disengagement of the mobile communicator therefrom.

Preferably, the at least first and second housing portions are arranged for relative axial movement from the closed position to an intermediate position and from the intermediate position to the open position. Additionally, the first and second housing portions are configured and arranged such that when they are arranged in the intermediate position the first housing portion socket hugs the mobile communicator and the second housing portion socket does not hug the mobile communicator. Additionally or alternatively, the first and second housing portions are configured and arranged such that when they are arranged in the open position neither the first housing portion socket nor the second housing portion socket hugs the mobile communicator.

In accordance with a preferred embodiment of the present invention, the point of sale terminal is configured to provide a user-sensible resistance, indicating to a user that the first and second housing portions are being moved from the closed position to the intermediate position. Additionally or alternatively, the point of sale terminal is configured to provide a user-sensible resistance, indicating to a user that the first and second housing portions are being moved from the intermediate position to the open position.

Preferably, the point of sale terminal is configured to provide a user-sensible resistance, indicating to a user that the first and second housing portions are being moved from the open position to the intermediate position. Additionally or alternatively, the point of sale terminal is configured to provide a user-sensible resistance, indicating to a user that the first and second housing portions are being moved from the intermediate position to the closed position.

In accordance with a preferred embodiment of the present invention in the intermediate position adjacent surfaces of the first and second housing portions are separated by a first separation. Additionally, in the open position the adjacent surfaces of the first and second housing portions are separated by a second separation, greater than the first separation.

Preferably, in the closed position adjacent surfaces of the first and second housing portions are in touching engagement.

In accordance with a preferred embodiment of the present invention the communications interface includes a connector adapted for mechanical engagement with the mobile communicator.

Preferably, the communications interface includes a wireless interface adapted for wireless engagement with the mobile communicator.

In accordance with a preferred embodiment of the present invention the point of sale terminal also includes at least one of a magnetic stripe card reader, a smart card interface, a contactless card interface and a bar code reader.

Preferably, the point of sale terminal also includes a slidable latch element, configured to lock the point of sale terminal is the closed position.

In accordance with a preferred embodiment of the present invention the at least first and second housing portions are configured to limit the relative axial movement beyond the open position.

Preferably, the first and second housing portions are configured when in the open position to allow the mobile communicator to be placed into operative engagement with the point of sale terminal. Additionally or alternatively, the first and second housing portions are configured when in the open position to allow the mobile communicator to be removed from operative engagement with the point of sale terminal.

BRIEF DESCRIPTION OF THE DRAWINGS

The present invention will be understood and appreciated more fully from the following detailed description, taken together with the drawings in which:

FIGS. 1A, 1B & 1C are simplified pictorial illustrations of a slidable engage/disengage point of sale terminal in operative association with a mobile communicator;

FIGS. 2A and 2B are respective downward and upward view simplified exploded view illustrations of the slidable engage/disengage point of sale terminal of FIGS. 1A-1C;

FIGS. 6A and 6B are simplified illustrations of a main mounting element, forming part of the slidable engage/disengage point of sale terminal of FIGS. 1A-2B, FIG. 6A being a top view pictorial illustration and FIG. 6B being a bottom view pictorial illustration;

FIGS. 10A, 10B, 10C and 10D are simplified illustrations of a first slidable pin element forming part of the slidable mounting assembly of FIGS. 7A-8;

FIGS. 15A/1 and 15A/2 are together a simplified illustration of the slidable engage/disengage point of sale terminal of FIGS. 1A-14C in a first operative orientation;

FIG. 15B is a simplified illustration of the slidable engage/disengage point of sale terminal of FIGS. 1A-14C in a second operative orientation;

FIG. 15C is a simplified illustration of the slidable engage/disengage point of sale terminal of FIGS. 1A-14C in a third operative orientation;

FIG. 15D is a simplified illustration of insertion of a mobile communicator into operative engagement with the slidable engage/disengage point of sale terminal of FIGS. 1A-14C, when it is in the third operative orientation;

FIG. 15E is a simplified illustration of the slidable engage/disengage point of sale terminal of FIGS. 1A-14C in the fourth operative orientation in operative engagement with the mobile communicator;

FIG. 15F is a simplified illustration of the slidable engage/disengage point of sale terminal of FIGS. 1A-14C in the first operative orientation in operative engagement with a mobile communicator in a latch-unlocked state;

FIG. 15G is a simplified illustration of the slidable engage/disengage point of sale terminal of FIGS. 1A-14C in the first operative orientation in operative engagement with a mobile communicator in a latch-locked state;

FIG. 15K is a simplified illustration of the slidable engage/disengage point of sale terminal of FIGS. 1A-14C in the first operative orientation in operative engagement with a mobile communicator returned to a latch-unlocked state;

FIGS. 15L/1 and 15L/2 are together a simplified illustration of the slidable engage/disengage point of sale terminal of FIGS. 1A-14C in engagement with the mobile communicator, in a fifth operative orientation;

FIGS. 15M/1 and 15M/2 are together a simplified illustration of the slidable engage/disengage point of sale terminal of FIGS. 1A-14C in the third operative orientation.

DETAILED DESCRIPTION OF A PREFERRED EMBODIMENT

Figure 2A:
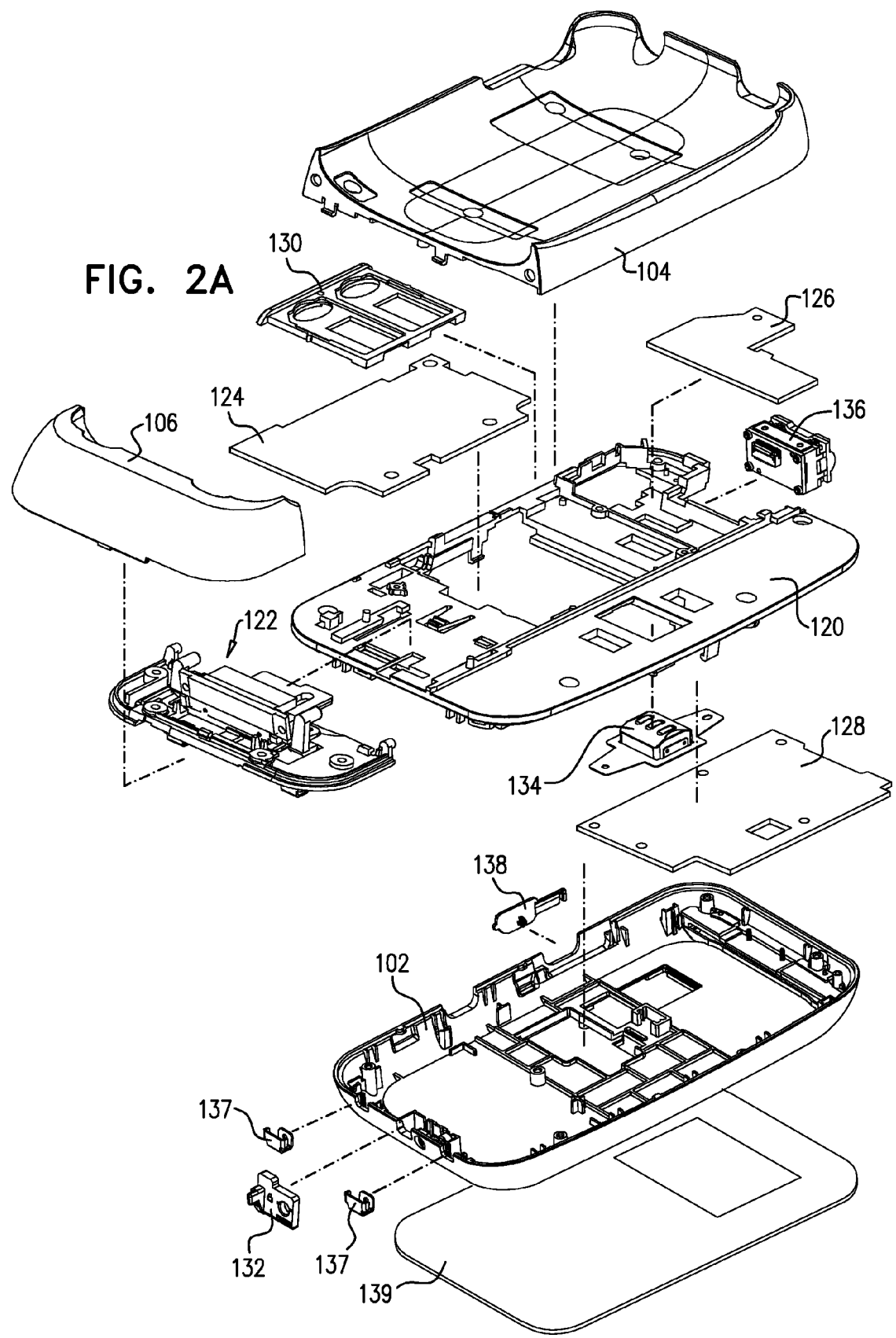

Reference is now made to FIGS. 1A, 1B & 1C, which are simplified pictorial illustrations of a slidable engage/disengage point of sale terminal in operative engagement with a mobile communicator. In the examples described hereinbelow, the mobile communicator is an IPHONE3®. It is appreciated, however, that the present invention is not limited to use with an IPHONE3® or any other mobile communicator and is suitable for use with any appropriate mobile communicator, with suitable modifications to take into account different shapes of various mobile communicators and different arrangements of user interface elements and connectors thereon.

As seen in FIGS. 1A, 1B and 1C, there is provided a slidable engage/disengage point of sale terminal 100 in operative association with an IPHONE® mobile communicator 101. The slidable engage/disengage point of sale terminal 100 includes a bottom housing portion 102, a main top housing portion 104, which is fixed with respect to bottom housing portion 102, and a slidable top housing portion 106, which is slidable with respect to bottom housing portion 102 and to main top housing portion 104 along an axis 108 in respective opposite engage and disengage directions defined by arrows 110 and 112. It is a particular feature of the present invention that operative engagement and disengagement of the slidable engage/disengage point of sale terminal 100 with respect to the mobile communicator 101 is provided by such sliding displacement of a housing portion.

It is thus appreciated that the slidable engage/disengage point of sale terminal 100 is formed with a housing including at least first and second housing portions, such as portions 106 and 104, which are arranged for relative axial movement from a closed position, as shown in FIG. 1A, to an open position. A fully open position is shown in FIGS. 1B and 1C.

The first housing portion, preferably portion 106, preferably includes a first housing portion socket 114 adapted for partially surrounding the mobile communicator 101. The second housing portion, such as main top housing portion 104 preferably includes a second housing portion socket 116 adapted for partially surrounding the mobile communicator 101.

Associated with the first housing portion, preferably portion 106, is a communications interface 118, adapted for operative communications engagement with mobile communicator 101. Communications interface 118 may be a conventional physical connector, as shown in FIG. 1C, which mechanically engages a corresponding physical socket in mobile communicator 101. Alternatively, communications interface 118 may be a wireless communications interface, employing wireless technology, such as BLUETOOTH®.

The first and second housing portions are preferably configured such that when they are arranged in a closed position, as shown in FIG. 1A, the first housing portion socket 114 and the second housing portion socket 116 together hug the mobile communicator 101 and prevent unwanted disengagement of the mobile communicator 101 therefrom.

Bottom housing portion 102 and top housing portion 104 are fixed to a main mounting element 120. A magnetic card swipe slot 121 is defined between main mounting element 120, which defines one edge wall of the slot 121, and main top housing portion 104 and slidable top housing portion 106, which define an opposite edge wall of the slot 121.

Reference is now made to FIGS. 2A and 2B, which are respective downward and upward view simplified exploded view illustrations of the slidable engage/disengage point of sale terminal 100 of FIGS. 1A-1C. It is seen that in addition to bottom housing portion 102, main top housing portion 104, slidable top housing portion 106, and main mounting element 120, there is also provided a slidable mounting assembly 122, which is fixed to slidable top housing portion 106.

Printed circuit boards 124, 126 and 128 are fixedly mounted generally as shown on main mounting element 120. A slide out smart card socket 130 slidably engages main mounting element 120. A slidable latch element 132 slidably engages bottom housing portion 102. A magnetic stripe reading head 134 and an optional bar code reader 136 are fixedly mounted, generally as shown, on main mounting element 120. Battery charger contacts 137 are fixedly mounted generally as shown on bottom housing portion 102. An on/off switch element 138 is mounted, generally as shown, on bottom housing portion 102. A generally flat keypad, contactless card interface and display assembly 139 is fixedly mounted generally as shown in a recess formed in bottom housing portion 102.

Figure 3A:
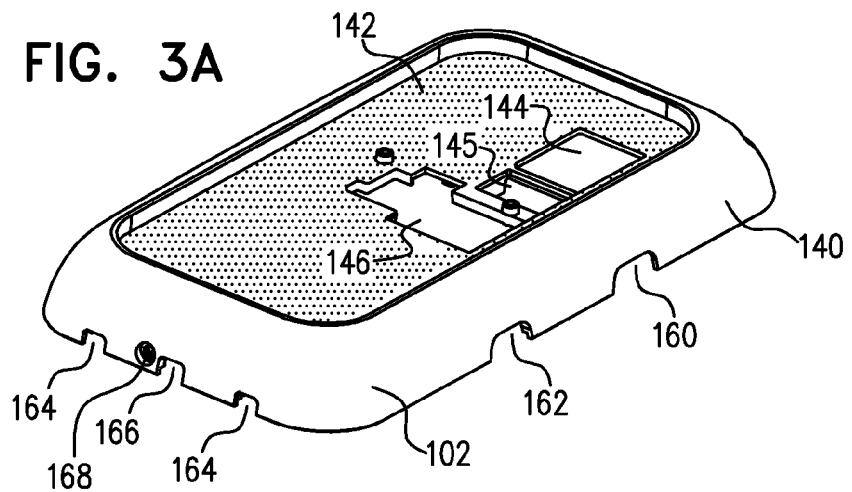
FIGS. 3A, 3B and 3C are simplified illustrations of a bottom housing portion, forming part of the slidable engage/disengage point of sale terminal of FIGS. 1A-2B, FIGS. 3A and 3B being bottom view pictorial illustrations taken along opposite directions and FIG. 3C being a top view pictorial illustration.
Figure 3B:
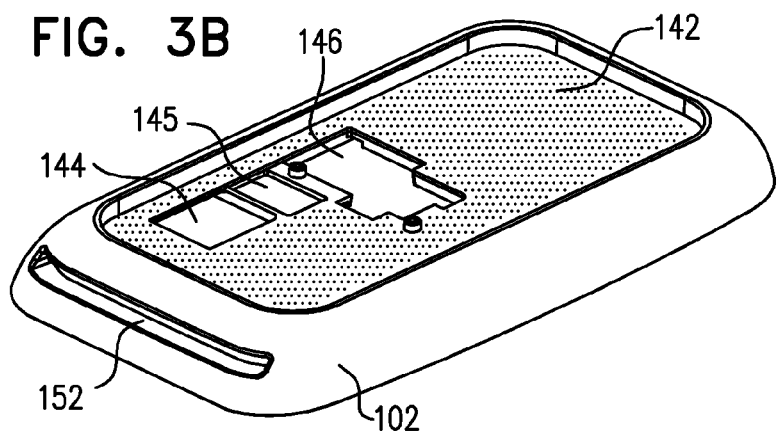
Figure 3C:
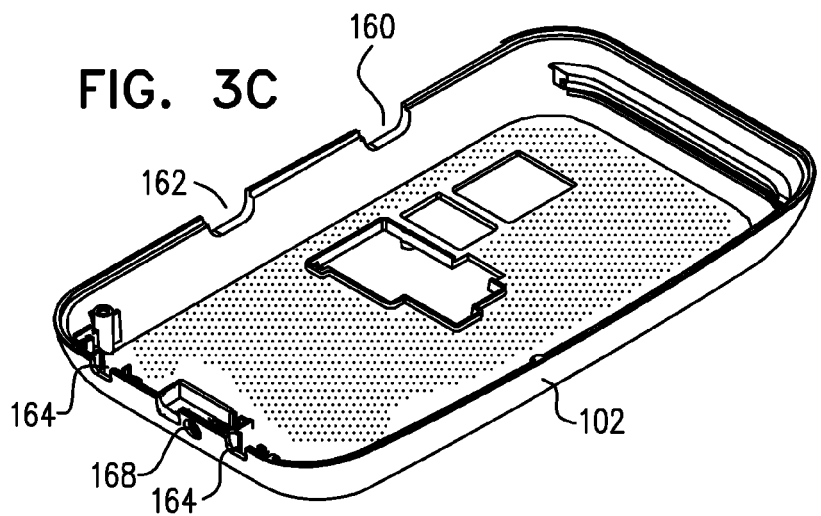

Reference is now made to FIGS. 3A, 3B and 3C, which are simplified illustrations of bottom housing portion 102, forming part of the slidable engage/disengage point of sale terminal 100 of FIGS. 1A-2B, FIGS. 3A and 3B being bottom view pictorial illustrations taken along opposite directions and FIG. 3C being a top view pictorial illustration. As seen in FIGS. 3A, 3B and 3C, the bottom housing portion 102 defines a curved circumferential wall 140 surrounding a recess 142, in which generally flat keypad, contactless card interface and display assembly 139 is fixedly mounted as by adhesive. Recess 142 preferably has formed therein various cut-outs designated by reference numerals 144, 145 and 146, which accommodate various components of the device, including components which connect the generally flat keypad, contactless card interface and display assembly 139 to other components of the slidable engage/disengage point of sale terminal 100 of FIGS. 1A-2B.

A smart card receiving slot 152 is provided in circumferential wall 140 at one end of the bottom housing portion 102. A plurality of connector socket cut outs are also provided in circumferential wall 140. These include a cut out 160 for accommodating on/off switch element 138, a cut out 162 for a power supply connector socket (not shown), cut outs 164 for battery charger contacts 137, a cut out 166 for latch element 132. A screw socket 168 is provided for a latch locking screw as will be described hereinbelow.

Figure 4A:
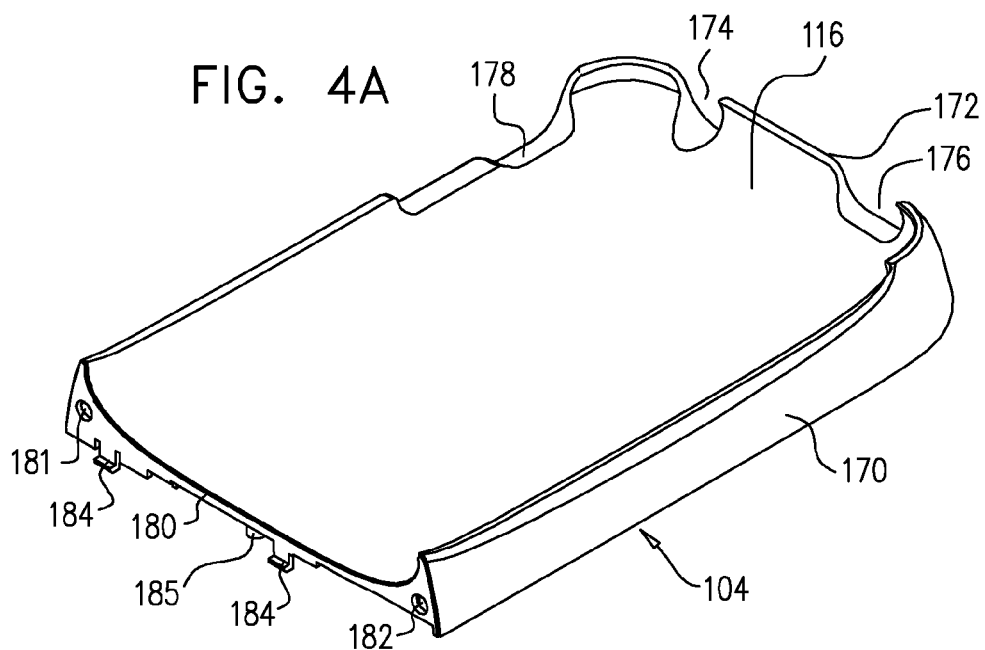
FIGS. 4A and 4B are simplified illustrations of a main top housing portion, forming part of the slidable engage/disengage point of sale terminal of FIGS. 1A-2B, FIG. 4A being a top view pictorial illustration and FIG. 4B being a bottom view pictorial illustration.
Figure 4B:
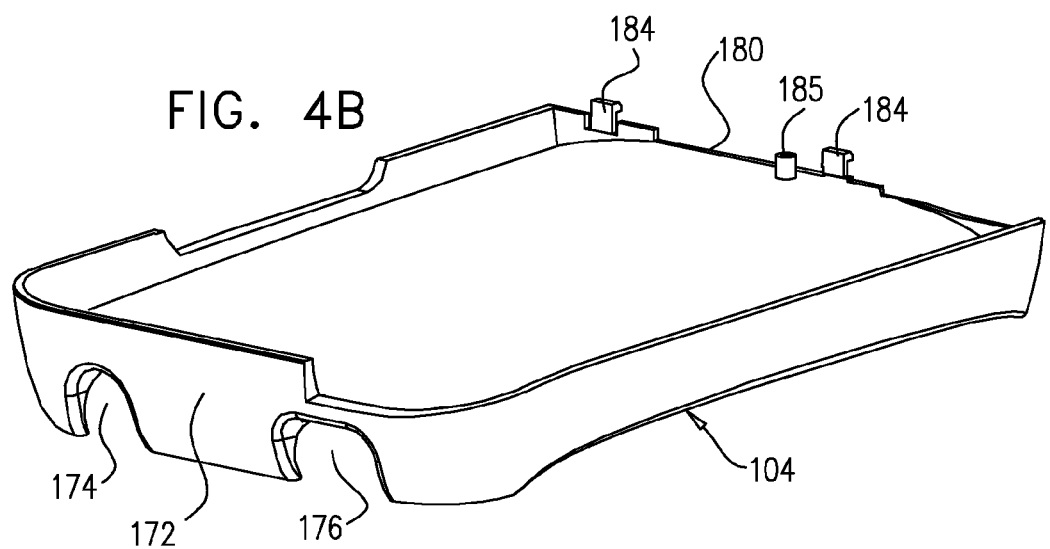

Reference is now made to FIGS. 4A and 4B, which are simplified illustrations of main top housing portion 104, forming part of the slidable engage/disengage point of sale terminal 100 of FIGS. 1A-2B, FIG. 4A being a top view pictorial illustration and FIG. 4B being a bottom view pictorial illustration. As seen in FIGS. 4A and 4B, the main top housing portion 104 defines a curved partially circumferential wall 170 surrounding socket 116 (FIGS. 1A-1C). Partially circumferential wall 170 is preferably formed at an end 172 of main top housing portion 104 with a pair of end cut outs 174 and 176 to provide access to the on/off button and to the ear phone plug socket of an IPHONE® and a side cut out 178 to provide access to the mute button of an IPHONE®.

At an opposite end 180 of main top housing portion 104 there are preferably provided a pair of pin receiving registration sockets respectively designated by reference numerals 181 and 182, which provide secure alignment and engagement with corresponding pins of slidable mounting assembly 122 when the slidable engage/disengage point of sale terminal 100 is in a first operative orientation as described hereinbelow.

At end 180 of main top housing portion 104 there are also preferably provided a pair of a pair of protrusions 184 which provide secure engagement with the main mounting element 120, thereby to prevent disengagement of main top housing 104 from main mounting element 120. A downward extending pin 185 is located intermediate protrusions 184.

Figure 5A:
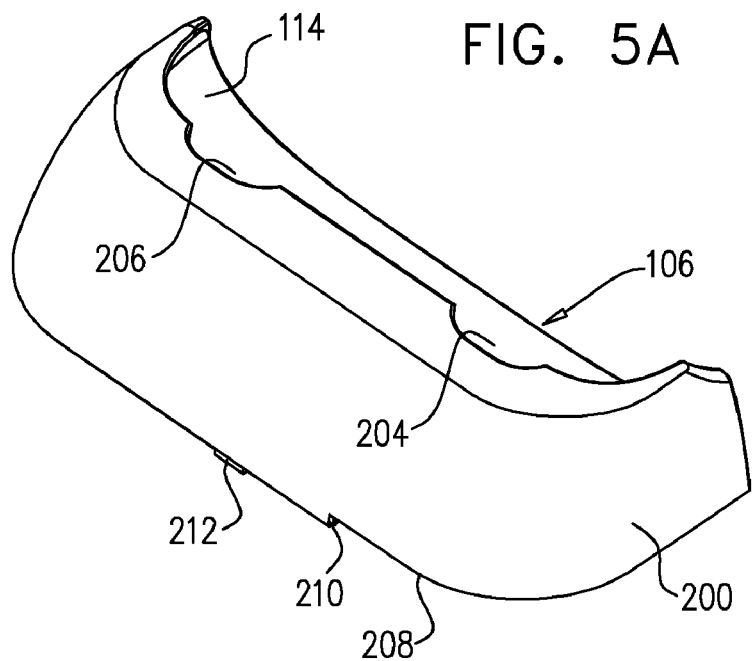
FIGS. 5A and 5B are simplified illustrations of a slidable top housing portion, forming part of the slidable engage/disengage point of sale terminal of FIGS. 1A-2B, FIG. 5A being a top view pictorial illustration and FIG. 5B being a bottom view pictorial illustration.
Figure 5B:
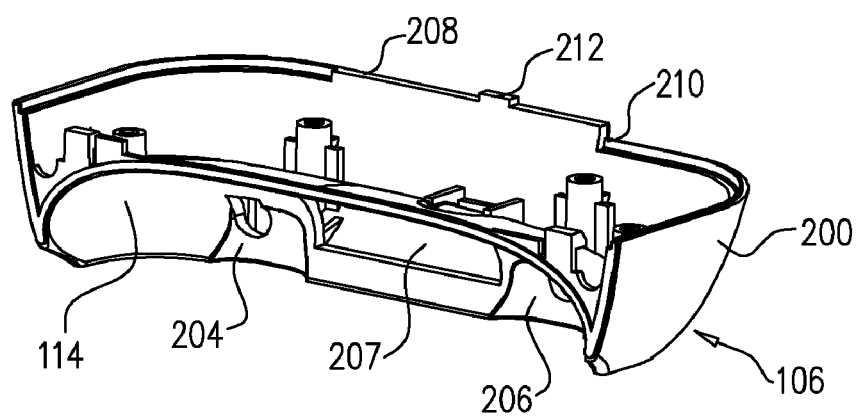

Reference is now made to FIGS. 5A and 5B, which are simplified illustrations of slidable top housing portion 106, forming part of the slidable engage/disengage point of sale terminal 100 of FIGS. 1A-2B, FIG. 5A being a top view pictorial illustration and FIG. 5B being a bottom view pictorial illustration. As seen in FIGS. 5A and 5B, the slidable top housing portion 106 defines a curved partially circumferential wall 200 surrounding socket 114 (FIGS. 1A-1C). Socket 114 is preferably formed with a pair of recesses 204 and 206, which provide sound conduits communicating with a microphone and a speaker of an IPHONE®. A cut out 207 is located generally between recesses 204 and 206. Partially circumferential wall 200 is formed with a bottom edge 208 having a shoulder 210 and a protrusion 212.

Figure 6B:
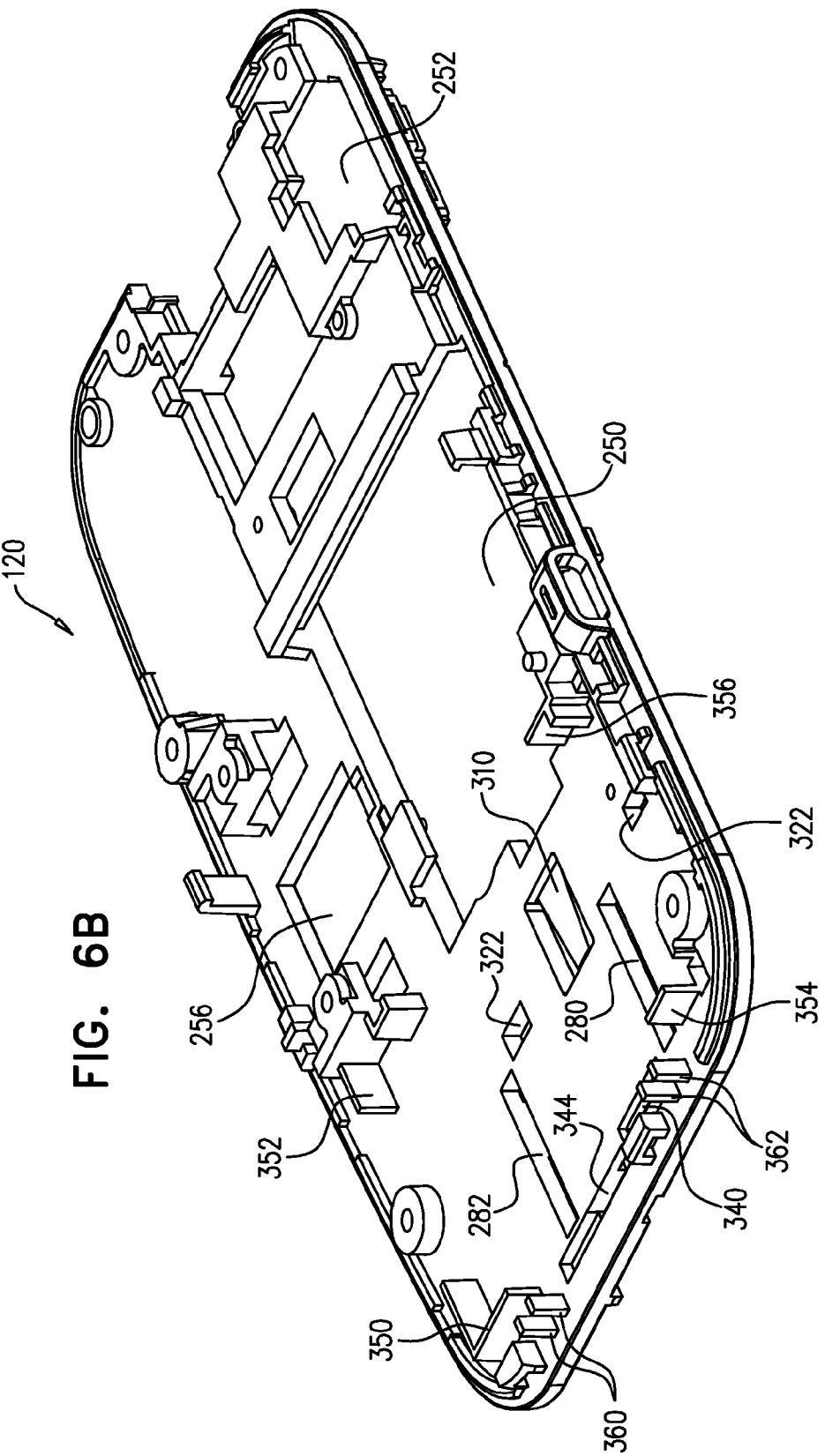

Reference is now made to FIGS. 6A and 6B, which are simplified illustrations of main mounting element 120, forming part of the slidable engage/disengage point of sale terminal 100 of FIGS. 1A-2B. As seen in FIGS. 6A and 6B, main mounting element 120 is a generally rectangular, generally flat element which includes cut out 250, which accommodates electrical components mounted on printed circuit boards 124 and 128 (FIGS. 2A-2B), cut outs 252 and 254, which accommodate electrical components mounted on printed circuit board 126 (FIGS. 2A-2B), and cut out 256, which accommodates magnetic stripe reading head 134 (FIGS. 2A-2B). Magnetic strip reading head 134 is mounted onto connection sockets 258 and 260. Bar code reader 136 (FIGS. 2A-2B) is mounted in a recess 262.

Main mounting element 120 is mounted onto bottom housing portion 102 typically by means of screws (not shown) which extend through screw sockets 263, 264, 265, 266 and 267. Main top housing portion 104 is mounted onto main mounting element 120 typically by means of screws (not shown), which extend through screw sockets 270, 272 and 274. An external power connection (not shown) preferably extends through opening 278.

As seen particularly in FIG. 6B, there are provided a pair of generally parallel slots 280 and 282 and as seen particularly in FIG. 6A, there are provided corresponding tracks 290 and 292, which partially overlie slots 280 and 282. Each of tracks 290 and 292 is formed with an inwardly facing side cut out, respectively designated by reference numerals 294 and 296, and with an upstanding pin, respectively designated by reference numerals 300 and 302. Track 292 is formed with an additional side cut out 304 which defines a narrowed forward end 306 of track 292 having a side surface 308 which is engaged by shoulder 210 of slidable top housing portion 106 when the slidable top housing portion 106 is in the first operative orientation (FIG. 15A/1).

A cantilevered catch tab 310 having first and second teeth 312 and 314 is provided generally intermediate tracks 290 and 292. A pair of snap fit engagement sockets 322 are provided for snap fit engagement by protrusions 184 of main top housing portion 104. A stop protrusion 326 for limiting motion of the slidable mounting assembly 122 is provided.

An aperture 340 accommodates a flexible connector (not shown) which is coupled to magnetic stripe reading head 134. An adjacent latch travel slot 344 accommodates latch element 132 and intersects a slidable mounting assembly latchable protrusion travel path recess 346. It is noted that protrusion 212 (FIGS. 5A and 5B) covers the forward end of recess 346 when the slidable top housing portion 106 is in the first operative orientation (FIG. 15A/1).

Upstanding elements 350, 352, 354 and 356 together operate to define a mounting volume for a battery pack (not shown). Upstanding element pairs 360 and 362 together operate to define a mounting volume for battery charger contracts 137.

Figure 7A:
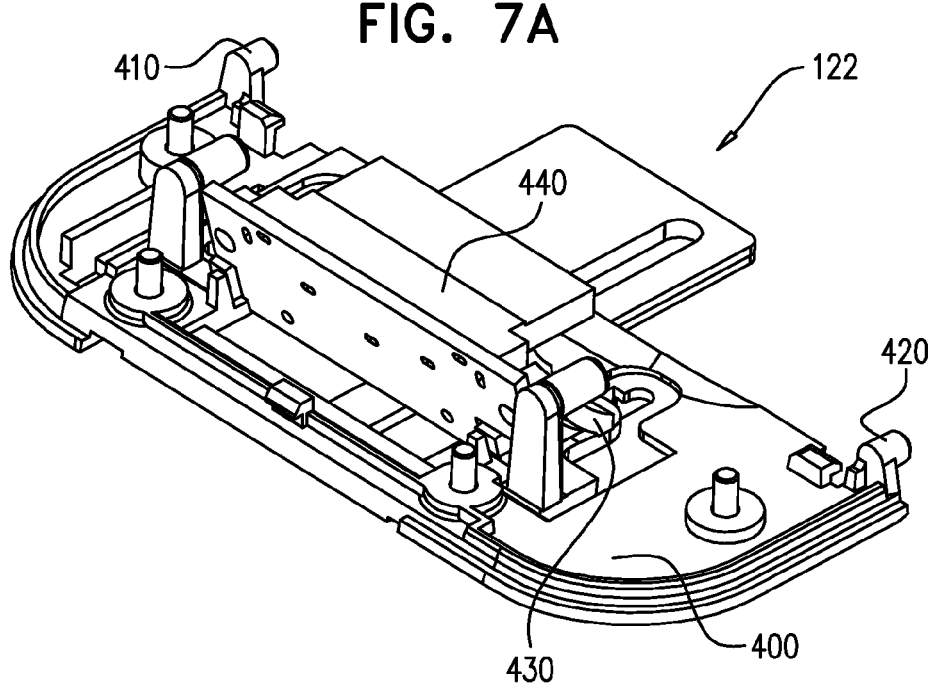
FIGS. 7A and 7B are simplified illustrations of a slidable mounting assembly, forming part of the slidable engage/disengage point of sale terminal of FIGS. 1A-2B, FIG. 7A being a top view pictorial illustration and FIG. 7B being a bottom view pictorial illustration.
Figure 7B:
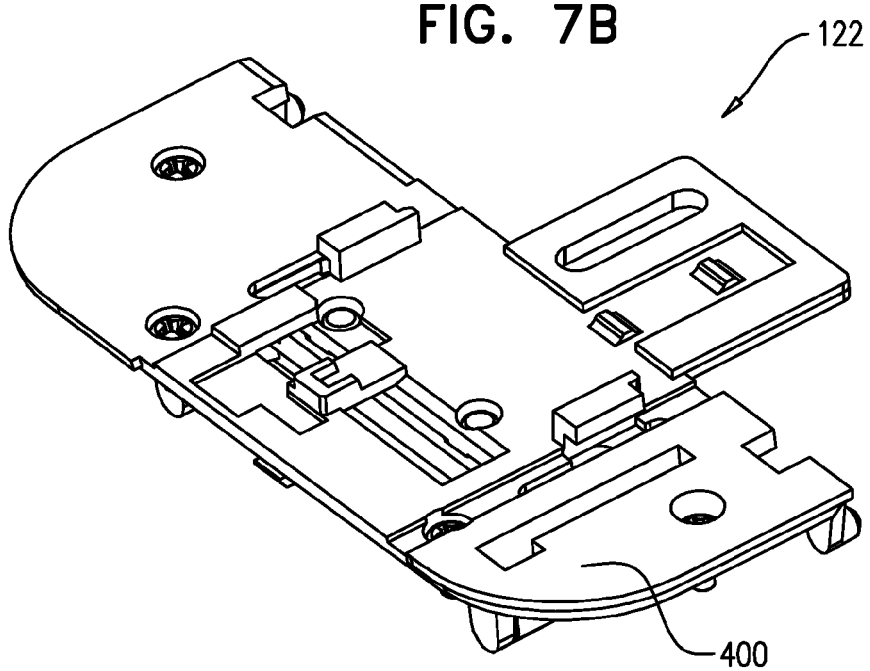
Figure 8:
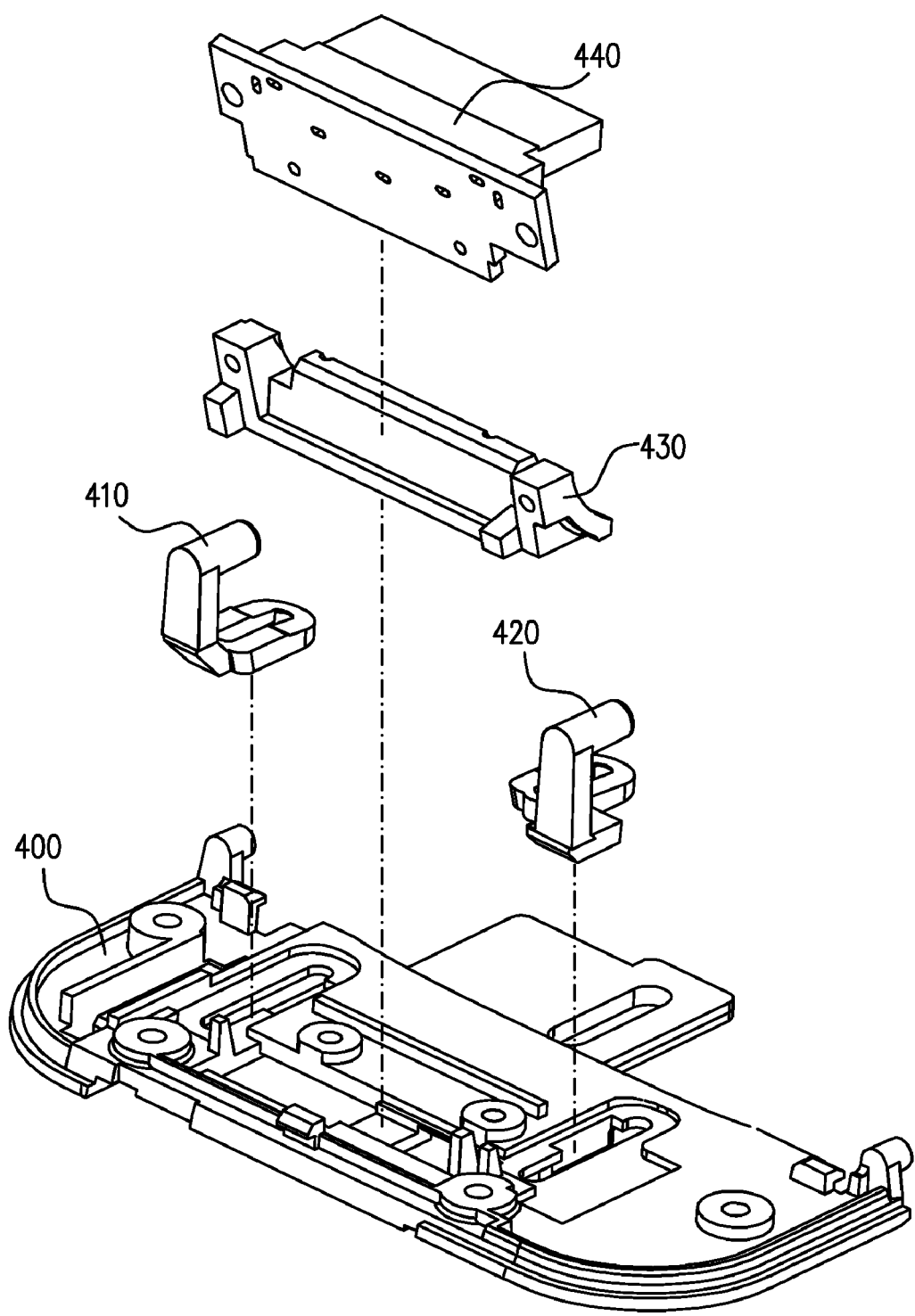
FIG. 8 is a simplified exploded view illustration of the slidable mounting assembly of FIGS. 7A and 7B.

Reference is now made to FIGS. 7A, 7B and 8, which are simplified illustrations of a slidable mounting assembly 122, forming part of the slidable engage/disengage point of sale terminal 100 of FIGS. 1A-2B.

As seen in FIGS. 7A, 7B and 8, the slidable mounting assembly 122 includes a base portion 400, which is described in detail hereinbelow with reference to FIGS. 9A and 9B, and first and second slidable pin elements 410 and 420, which are described in detail hereinbelow with reference to FIGS. 10A-10D and FIGS. 11A-11D, respectively, which are slidably mounted onto base portion 400. The slidable mounting assembly 122 also includes a connector support element 430, described in detail hereinbelow with reference to FIGS. 12A & 12B, which is fixedly mounted onto base portion 400, and a connector assembly 440, described in detail hereinbelow with reference to FIGS. 13A & 13B, which is fixedly mounted onto connector support element 430.

Figure 9A:
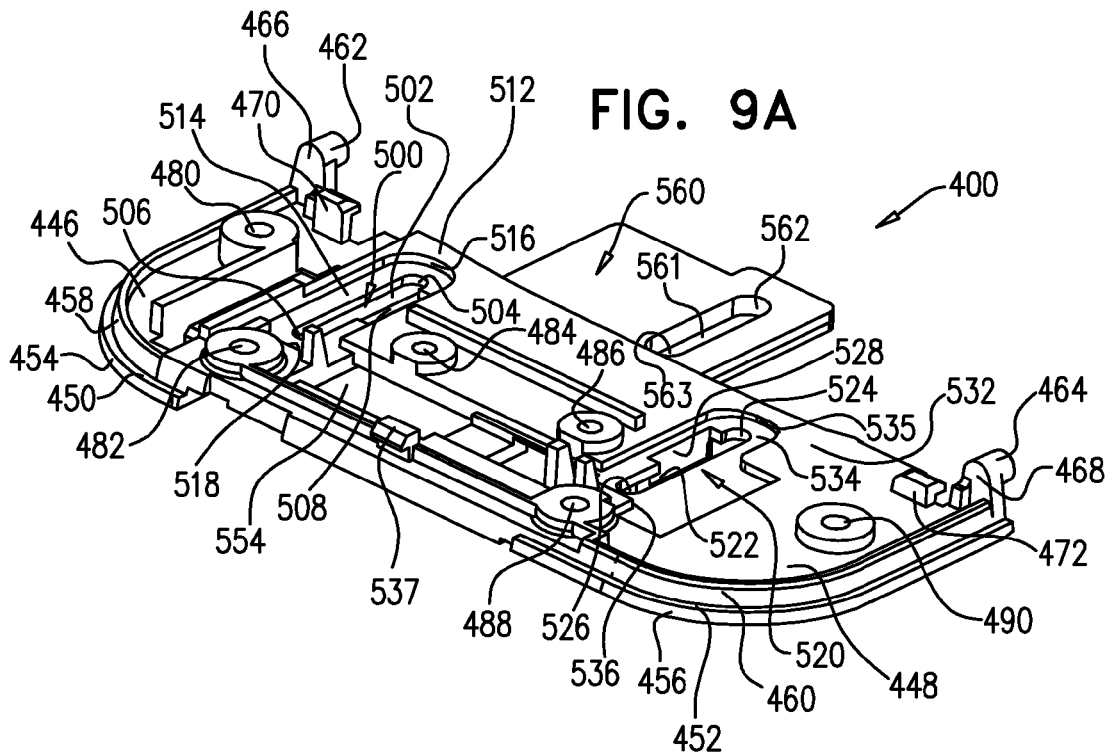
FIGS. 9A and 9B are simplified pictorial top view and bottom view illustrations of a base portion of the slidable mounting assembly of FIGS. 7A-8.
Figure 9B:
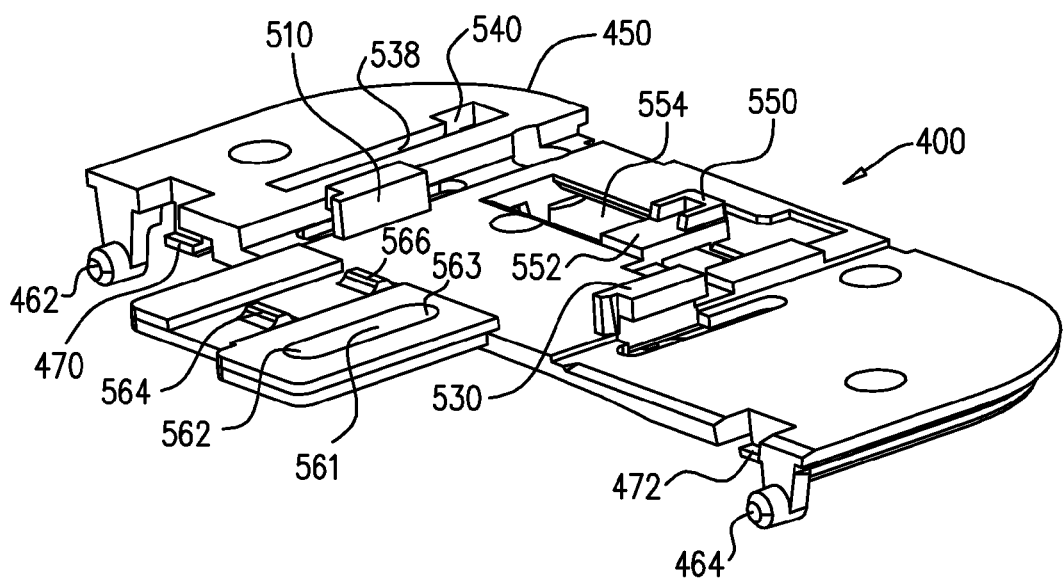
Figure 11A:
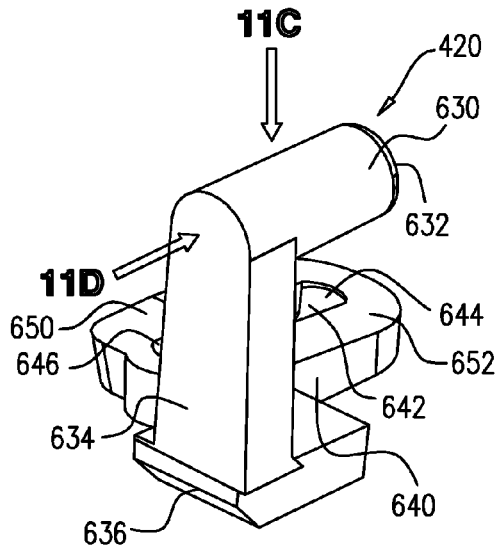
FIGS. 11A, 11B, 11C and 11D are simplified illustrations of a second slidable pin element forming part of the slidable mounting assembly of FIGS. 7A-8.
Figure 11B:
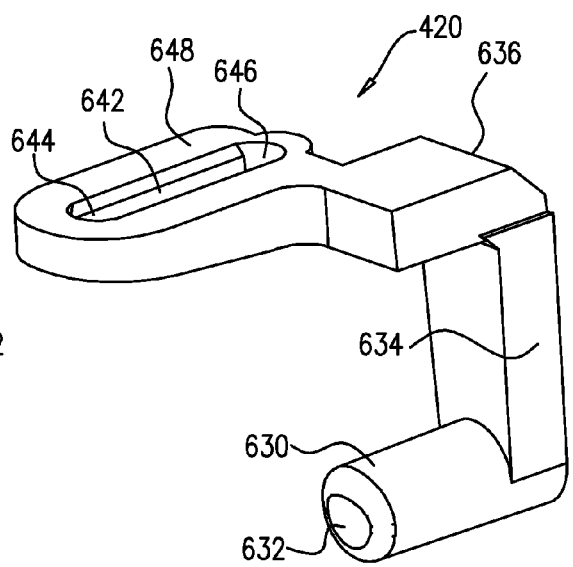
Figure 11C:
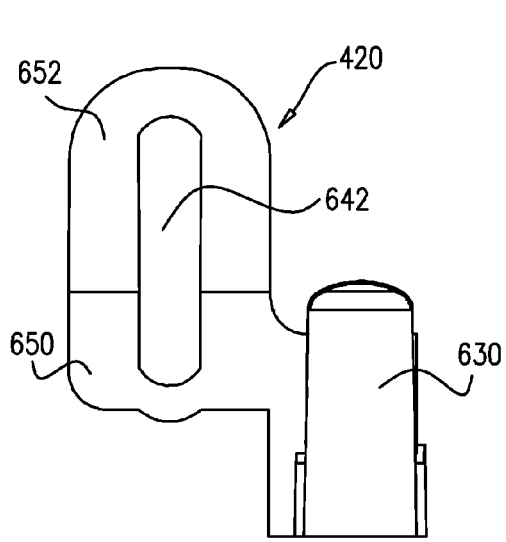
Figure 11D:
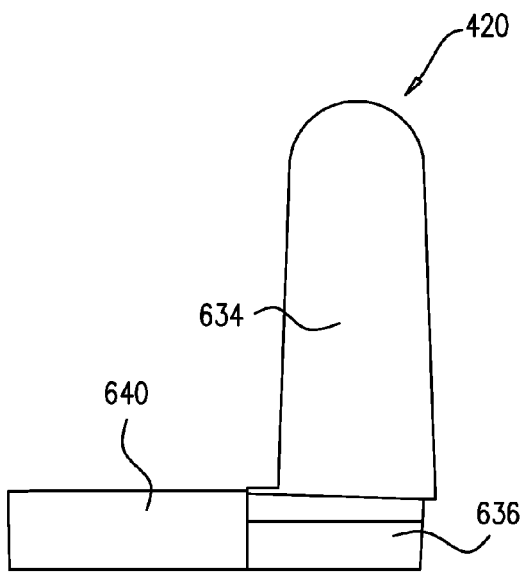

Reference is now made to FIGS. 9A and 9B, which are simplified pictorial top view and bottom view illustrations of base portion 400 of the slidable mounting assembly of FIGS. 7A-8. As seen in FIGS. 9A & 9B, the base portion 400 of the slidable mounting assembly 122 is generally planar and includes first and second generally planar corner surfaces 446 and 448 having respective curved corner edges 450 and 452 including respective lower outer lips 454 and 456 and higher inner lips 458 and 460.

First and second spaced inwardly directed registration pins 462 and 464 extend in a direction generally parallel to the plane of base portion 400 and are raised from respective planar corner surfaces 446 and 448 by respective upstanding support portions 466 and 468. Adjacent each of pins 462 and 464 there are provided respective cover portion engagement protrusions 470 and 472 to slidable top housing portion 106 sockets (not shown).

Screw engagement sockets 480, 482, 484, 486, 488 and 490 are formed at various locations on base portion 400. Screw engagement sockets 480, 482, 488 and 490 are engaged by screws (not shown), which fix base portion 400 to slidable top housing portion 106. Screw engagement sockets 482 and 484 are engaged by screws (not shown), which fix base portion 400 to connector support element 430 (FIG. 8).

A first pin element socket 500 is formed on base portion 400 and includes an elongate cut out 502 having rounded ends 504 and 506 and having a widened side portion 508. As seen particularly in FIG. 9B, an elongate track 510 underlies widened side portion 508. Surrounding elongate cut out 502 and widened side portion 508 on a surface 512 of base portion 400 is a shallow recess 514 having an inward end 516 and an outward end 518.

A second pin element socket 520 is formed on base portion 400 and includes an elongate cut out 522 having rounded ends 524 and 526 and having a widened side portion 528. As seen particularly in FIG. 9B, an elongate track 530 underlies widened side portion 528. Surrounding elongate cut out 522 and widened side portion 528 on a surface 532 of base portion 400 is a shallow recess 534 having an inward end 535 and an outward end 536.

A slidable top housing portion engagement protrusion 537 is located generally equidistant between the curved corner edges 450 and 452. An elongate cut out 538, having a widened end portion 540, is provided inwardly of corner edge 450.

As seen particularly in FIG. 9B, there is seen a downwardly facing generally U-shaped protrusion 550 which extends downwardly from a bridge portion 552 which spans a cut out 554, formed in base portion 400.

An inwardly-directed extension portion 560 includes an elongate cut out 561 having rounded ends 562 and 563. On an underside of inwardly-directed extension portion 560 there are provided a pair of mutually spaced downwardly directed teeth 564 and 566.

Reference is now made to FIGS. 10A, 10B, 10C and 10D, which are simplified illustrations of first slidable pin element 410 forming part of the slidable mounting assembly of FIGS. 7A-8. The relationship between the various views of the first slidable pin element 410 is indicated by suitably labeled arrows in the drawings.

As seen in FIGS. 10A-10D, first slidable pin element 410 includes a generally circular cylindrical portion 600 having an asymmetrical end 602. Cylindrical portion 600 extends from an upstanding support portion 604, which in turn extends from an inclined intermediate support portion 606. Intermediate support portion 606 extends from a base portion 610, which is formed with an elongate slot 612, having respective rounded ends 614 and 616. Base portion 610 has a generally flat underneath surface 618 and a top surface which includes a generally flat top surface portion 620 and a downwardly tapered top surface portion 622.

Reference is now made to FIGS. 11A, 11B, 11C and 11D, which are simplified illustrations of second slidable pin element 420 forming part of the slidable mounting assembly of FIGS. 7A-8. The relationship between the various views of the second slidable pin element 420 is indicated by suitably labeled arrows in the drawings.

As seen in FIGS. 11A-11D, second slidable pin element 420 includes a generally circular cylindrical portion 630 having an asymmetric end 632. Cylindrical portion 630 extends from an upstanding support portion 634, which in turn extends from first base portion 636. First base portion 636 extends transversely from a second base portion 640, which is formed with an elongate slot 642 having respective rounded ends 644 and 646. Second base portion 640 has a generally flat underneath surface 648 and a top surface which includes a generally flat top surface portion 650 and a downwardly tapered top surface portion 652.

Figure 12A:
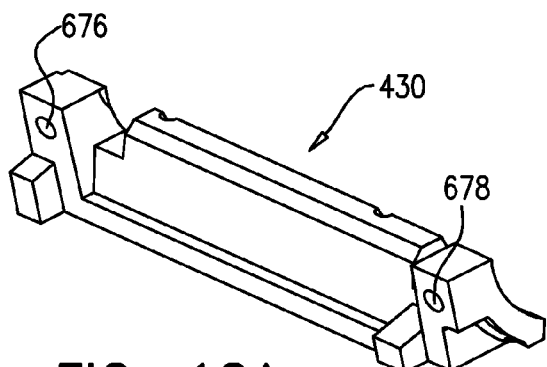
FIGS. 12A and 12B are simplified pictorial top view and bottom view illustrations of a connector support element forming part of the slidable mounting assembly of FIGS. 7A-8.
Figure 12B:
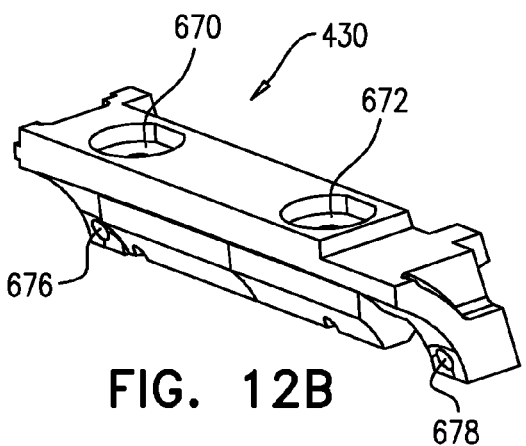

Reference is now made to FIGS. 12A and 12B, which are simplified pictorial top view and bottom view illustrations of connector support element 430 forming part of the slidable mounting assembly of FIGS. 7A-8. As seen particularly in FIG. 12B, connector support element 430 includes a pair of screw engagement sockets 670 and 672 for fixed mounting of connector support element 430 onto base portion 400 of the slidable mounting assembly 122 at screw engagement sockets 484 and 486 thereof. As seen in FIGS. 12A and 12B, connector support element 430 also includes a pair of screw engagement sockets 676 and 678 for fixed mounting of connector assembly 440 thereto.

Figure 13A:
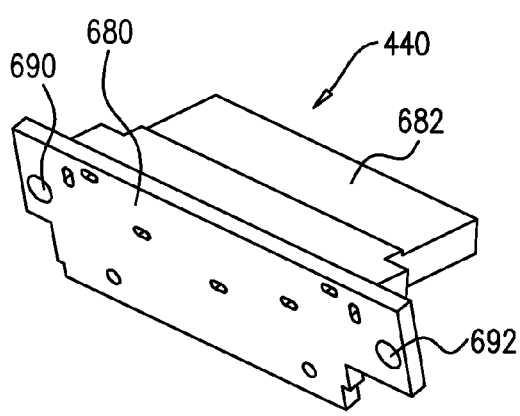
FIGS. 13A and 13B are simplified pictorial top view and bottom view illustrations of a connector assembly, forming part of the slidable mounting assembly of FIGS. 7A-8.
Figure 13B:
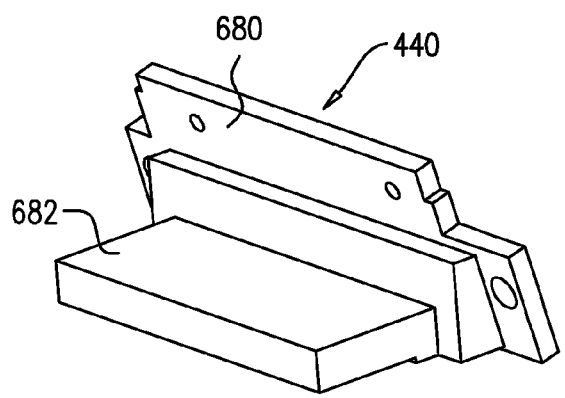

Reference is now made to FIGS. 13A and 13B, which are simplified pictorial top view and bottom view illustrations of connector assembly 440 forming part of the slidable mounting assembly of FIGS. 7A-8. As seen in FIGS. 13A and 13B, the connector assembly 440 preferably includes a PCB 680 and a connector 682, which is fixedly mounted onto PCB 680 and is suitable for operative connection to a corresponding connection socket of a mobile communicator 101, such as an IPHONE®. PCB 680 is preferably formed with screw engagement sockets 690 and 692 for fixed mounting of PCB 680 and thus of connector assembly 440 onto connector support element 430 at screw engagement sockets 676 and 678 respectively.

Figure 14A:
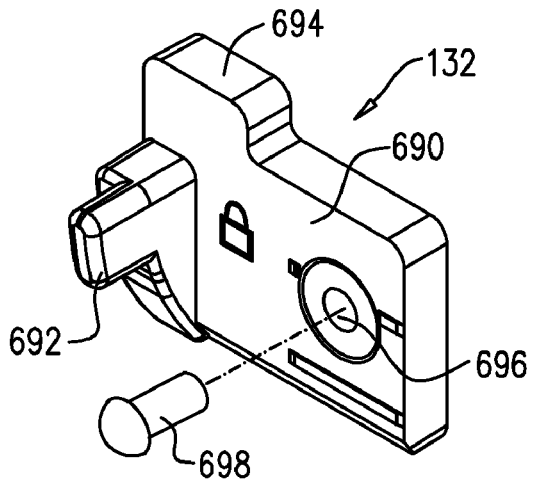
FIGS. 14A, 14B and 14C are simplified pictorial illustrations of a slidable latch element forming part of the slidable engage/disengage point of sale terminal of FIGS. 1A-2B.
Figure 14B:
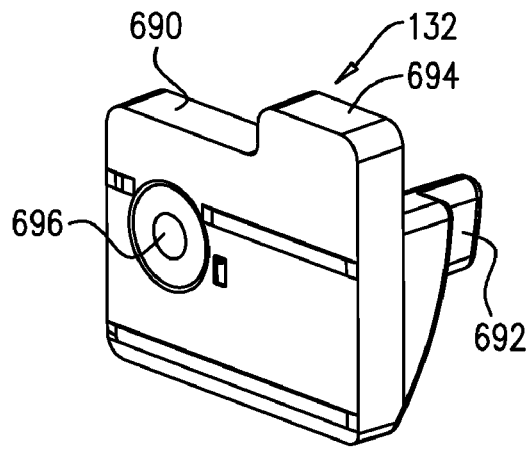
Figure 14C:
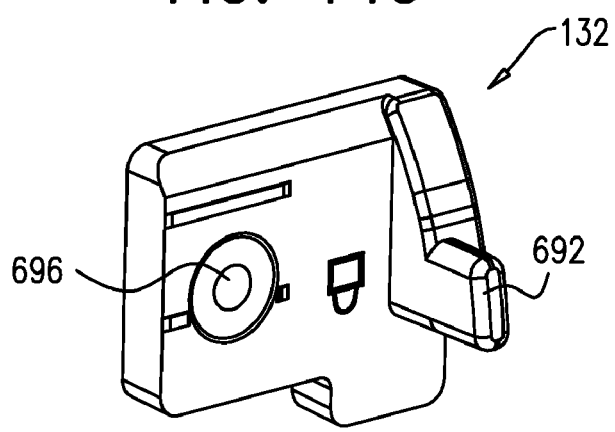

Reference is now made to FIGS. 14A, 14B and 14C, which are simplified illustrations of slidable latch element 132, forming part of the slidable engage/disengage point of sale terminal 100 of FIGS. 1A-2B.

As seen in FIGS. 14A-14C, the slidable latch element 132 includes a generally planar portion 690 having a finger engagement protrusion 692 extending perpendicularly therefrom and a latch operating lever portion 694 extending transversely therefrom. A screw engagement socket 696 is adapted to be engaged by a locking screw 698 which can be inserted via screw socket 168 (FIGS. 3A & 3C).

Reference is now made to FIGS. 15A/1 and 15A/2, which are together a simplified illustration of the slidable engage/disengage point of sale terminal 100 of FIGS. 1A-14C in a first operative orientation. As seen in FIGS. 15A/1 and 15A/2, in the first operative orientation, the slidable engage/disengage point of sale terminal 100 of FIGS. 1A-13B is closed but a mobile communicator 101 is not operatively engaged thereby.

As seen in FIGS. 15A/1 and 15A/2, particularly where slidable top housing portion is removed, and specifically at enlargements A, B and C, pin 300 of main mounting element 120 (FIG. 6A) is located in elongate cut out 502 of base portion 400 of slidable mounting assembly 122 adjacent rounded end 506 thereof and is also simultaneously located in elongate slot 612 of first slidable pin element 410 (FIGS. 10A-10D) adjacent rounded end 616 thereof. It is also seen that base portion 610 of first slidable pin element 410 is located at the outward end 518 of recess 514 formed in base portion 400.

Correspondingly, pin 302 of main mounting element 120 (FIG. 6A) is located in elongate cut out 522 of base portion 400 of slidable mounting assembly 122 adjacent rounded end 526 thereof and is also simultaneously located in elongate slot 642 of second slidable pin element 420 (FIGS. 11A-11D) adjacent rounded end 646 thereof. Second base portion 640 of second slidable pin element 420 (FIGS. 11A-11D) is located at the outward end 536 of recess 534 formed in base portion 400.

As seen in FIG. 15A/1, particularly at enlargement D, cantilevered catch tab 310 having first and second teeth 312 and 314 is engaged by the underside of inwardly-directed extension portion 560, having formed thereon mutually spaced downwardly directed teeth 564 and 566 (FIG. 9B). More specifically, downwardly directed tooth 566 lies in a valley defined between teeth 312 and 314 and downwardly directed tooth 564 lies inwardly thereof along cantilevered catch tab 310. The engagement of downwardly directed tooth 566 with valley defined between teeth 312 and 314 slightly flexes the cantilevered catch tab 310 downwardly.

As seen in FIG. 15A/2, particularly where slidable top housing portion 106, slidable pins elements 410 & 420, connector support element 430 and connector assembly 440 are removed, and specifically at enlargements E & F, pin 185 of main top housing portion 104 is located within elongate cut out 561 of base portion 400 adjacent rounded end 563 thereof.

As seen in FIG. 15A/2, specifically at enlargements G and H, elongate tracks 510 and 530 of base portion 400 (FIG. 9B) operatively and slidably engage corresponding tracks 290 and 292 of main mounting element 120 (FIG. 6A), permitting slidable extension of top housing portion 106 and slidable mounting assembly 122, relative to main top housing portion 104 and to bottom housing portion 102.

As also seen in FIGS. 15A/1 and 15A/2, registration pins 462 and 464 of base portion 400 are fully engaged in pin receiving registration sockets 181 and 182 at end 180 of main top housing portion 104.

Reference is now made to FIG. 15B, which is a simplified illustration of the slidable engage/disengage point of sale terminal 100 of FIGS. 1A-14C in a second operative orientation in which the slidable top housing portion 106 and slidable mounting assembly 122 are extended outwardly relative to main top housing portion 104 and to bottom housing portion 102 to a first extent, typically defining a separation between adjacent surfaces 700 and 702 of the slidable top housing portion 106 and the main top housing portion 104 respectively, typically of 3 mm.

It is seen from a comparison of FIG. 15B with FIGS. 15A/1 and 15A/2 that whereas in FIGS. 15A/1 and 15A/2, in the first operative orientation, the slidable engage/disengage point of sale terminal 100 of FIGS. 1A-14C is closed, in the second operative orientation of FIG. 15B, the slidable engage/disengage point of sale terminal 100 is partially opened by the user grasping the slidable top housing portion 106 with one hand and the bottom housing portion 102 with his other hand, and sliding the slidable mounting assembly 122 relative to the bottom housing portion 102 in the direction indicated by arrow 710.

Whereas in the first operative orientation shown in FIGS. 15A/1 and 15A/2, as seen particularly at enlargements A, B and C thereof, pin 300 of main mounting element 120 (FIG. 6A) is located in elongate cut out 502 of base portion 400 of slidable mounting assembly 122 adjacent rounded end 504 thereof and is also simultaneously located in elongate slot 612 of first slidable pin element 410 (FIGS. 10A-10D) adjacent rounded end 616 thereof, in the second operative orientation shown in FIG. 15B, pin 300 of main mounting element 120 (FIG. 6A) is located in elongate cut out 502 of base portion 400 of slidable mounting assembly 122 at an intermediate location therealong and is also simultaneously located in elongate slot 612 of first slidable pin element 410 (FIGS. 10A-10D) adjacent rounded end 614 thereof.

It is also seen that base portion 610 of first slidable pin element 410 (FIGS. 10A-10D) remains located at the outward end 518 of recess 514 formed in base portion 400.

Correspondingly, whereas in the first operative orientation shown in FIGS. 15A/1 and 15A/2, pin 302 of main mounting element 120 (FIG. 6A) is located in elongate cut out 522 of base portion 400 of slidable mounting assembly 122 adjacent rounded end 524 thereof and is also simultaneously located in elongate slot 642 of second slidable pin element 420 (FIGS. 11A-11D) adjacent rounded end 646 thereof, in the second operative orientation shown in FIG. 15B, pin 302 of main mounting element 120 (FIG. 6A) is located in elongate cut out 522 of base portion 400 of slidable mounting assembly 122 at an intermediate location therealong and is also simultaneously located in elongate slot 642 of second slidable pin element 420 (FIGS. 11A-11D) adjacent rounded end 644 thereof. Second base portion 640 of second slidable pin element 420 (FIGS. 11A-11D) remains located at the outward end 536 of recess 534 formed in base portion 400.

Whereas, as seen in FIG. 15A/1, particularly at enlargement D, downwardly directed tooth 566 lies in a valley defined between teeth 312 and 314 and downwardly directed tooth 564 lies inwardly thereof along cantilevered catch tab 310, outward displacement of inwardly-directed extension portion 560 to the second operative orientation shown in FIG. 15B, as particularly seen at enlargement D, causes downwardly directed tooth 566 to lie outwardly of valley defined between teeth 312 and 314 and downwardly directed tooth 564 to remain at a position inwardly of the valley defined between teeth 312 and 314. The disengagement of downwardly directed tooth 566 from valley defined between teeth 312 and 314 slightly flexes the cantilevered catch tab 310 and provides a user-sensible resistance which indicates to the user that the slidable engage/disengage point of sale terminal 100 of FIGS. 1A-14C is being opened.

Whereas, in the first operative orientation shown in FIGS. 15A/1 and 15A/2, registration pins 462 and 464 of base portion 400 are fully engaged in pin receiving registration sockets 181 and 182 at end 180 of main top housing portion 104, in the second operative orientation shown in FIG. 15B, registration pins 462 and 464 of base portion 400 are fully disengaged from respective pin receiving registration sockets 181 and 182 at end 180 of main top housing portion 104.

Reference is now made to FIG. 15C, which is a simplified illustration of the slidable engage/disengage point of sale terminal 100 of FIGS. 1A-14C in a third operative orientation in which the slidable top housing portion 106 and slidable mounting assembly 122 are further extended outwardly relative to main top housing portion 104 and to bottom housing portion 102 to a second extent, typically defining a separation between adjacent surfaces 700 and 702 of the slidable top housing portion 106 and the main top housing portion 104 respectively, typically of 8 mm.

It is seen from a comparison of FIG. 15C with FIG. 15B that whereas in FIG. 15B, in the second operative orientation, the slidable engage/disengage point of sale terminal 100 of FIGS. 1A-14C is partially open, in the third operative orientation of FIG. 15C, the slidable engage/disengage point of sale terminal 100 is fully opened by the user grasping the top housing portion 106 with one hand and the bottom housing portion 102 with his other hand, and sliding the slidable mounting assembly 122 relative to the bottom housing portion 102 in the direction indicated by arrow 720, which is identical to the direction indicated by arrow 710 (FIG. 15B).

Whereas in the second operative orientation shown in FIG. 15B, pin 300 of main mounting element 120 (FIG. 6A) is located in elongate cut out 502 of base portion 400 of slidable mounting assembly 122 at an intermediate location thereaolong and is also simultaneously located in elongate slot 612 of first slidable pin element 410 (FIGS. 10A-10D) adjacent rounded end 614 thereof, in the third operative orientation shown in FIG. 15C, pin 300 of main mounting element 120 (FIG. 6A) is located in elongate cut out 502 of base portion 400 of slidable mounting assembly 122 adjacent rounded end 504 and is also simultaneously located in elongate slot 612 of first slidable pin element 410 (FIGS. 10A-10D) adjacent rounded end 614 thereof.

It is also seen that base portion 610 of first slidable pin element 410 (FIGS. 10A-10D) is now located at the inward end 516 of recess 514 formed in base portion 400 of slidable mounting assembly 122.

Correspondingly, whereas pin 302 in the second operative orientation shown in FIG. 15B of main mounting element 120 (FIG. 6A) is located in elongate cut out 522 of base portion 400 of slidable mounting assembly 122 at an intermediate location therealong and is also simultaneously located in elongate slot 642 of second slidable pin element 420 (FIGS. 11A-11D) adjacent rounded end 646 thereof, in the third operative orientation shown in FIG. 15C, pin 302 of main mounting element 120 (FIG. 6A) is located in elongate cut out 522 of base portion 400 of slidable mounting assembly 122 adjacent end 524 thereof and is also simultaneously located in elongate slot 642 of second slidable pin element 420 (FIGS. 11A-11D) adjacent rounded end 644 thereof. Second base portion 640 of second slidable pin element 420 (FIGS. 11A-11D) is now located at the inward end 535 of recess 534 formed in base portion 400.

Whereas, as seen in FIG. 15B, particularly at enlargement D, downwardly directed tooth 566 lies outwardly of the valley defined between teeth 312 and 314 and downwardly directed tooth 564 remains at a position inwardly of the valley defined between teeth 312 and 314, further outward displacement of slidable mounting assembly 122 causes both of downwardly directed teeth 564 and 566 to lie outwardly of the valley defined between teeth 312 and 314, as seen particularly in enlargement D in FIG. 15C. The momentary engagement and disengagement of downwardly directed tooth 564 respectively with and from the valley defined between teeth 312 and 314 twice slightly flexes the cantilevered catch tab 310 and provides a user-sensible resistance which indicates to the user that the slidable engage/disengage point of sale terminal 100 of FIGS. 1A-14C is being fully opened.

From a comparison of FIG. 15C with FIGS. 15A/1 and 15A/2, it is seen that whereas in the first operative orientation shown in FIG. 15A/2, particularly at enlargements E & F, pin 185 of main top housing portion 104 is located within elongate cut out 561 of base portion 400 adjacent rounded end 563, in the third operative orientation shown in FIG. 15C, pin 185 of main top housing portion 104 is located within elongate cut out 561 of base portion 400 adjacent rounded end 562. It is appreciated that the engagement of pin 185 with elongate cut out 561 is operative to limit the extension of the slidable mounting assembly 122 relative to the remainder of the slidable engage/disengage point of sale terminal 100 of FIGS. 1A-14C along axis 108 (FIG. 1A) in a direction defined by arrows 710 and 720.

Reference is now made to FIG. 15D, which shows insertion of a mobile communicator 101 into the slidable engage/disengage point of sale terminal 100 of FIGS. 1A-14C in the third operative orientation.

Reference is now made to FIG. 15E, which shows partial retraction of the slidable engage/disengage point of sale terminal 100 of FIGS. 1A-14C in a fourth operative orientation in engagement with a mobile communicator 101 in which the slidable top housing portion 106 and slidable mounting assembly 122 are slightly retracted from their operative orientation shown in FIGS. 15C and 15D, typically defining a separation between adjacent surfaces 700 and 702 of the slidable top housing portion 106 and the main top housing portion 104 respectively, typically approximately 3 mm.

It is seen from a comparison of FIG. 15E with FIG. 15C that whereas in the third operative orientation of FIG. 15C, the slidable engage/disengage point of sale terminal 100 is fully opened by the user grasping the top housing portion 106 with one hand and the bottom housing portion 102 with his other hand, and sliding the slidable mounting assembly 122 relative to the bottom housing portion 102 in the direction indicated by arrow 720, in the fourth operative orientation of FIG. 15E, the slidable mounting assembly 122 is partially retracted by the user grasping the top housing portion 106 with one hand and the bottom housing portion 102 with his other hand, and sliding the slidable mounting assembly 122 relative to the bottom housing portion 102 in the direction indicated by arrow 730, which is opposite to the direction indicated by arrow 720.

Whereas in the third operative orientation shown in FIG. 15C, pin 300 of main mounting element 120 (FIG. 6A) is located in elongate cut out 502 of base portion 400 of slidable mounting assembly 122 adjacent rounded end 504 and is also simultaneously located in elongate slot 612 of first slidable pin element 410 (FIGS. 10A-10D) adjacent rounded end 614 thereof, in the fourth operative orientation shown in FIG. 15E, pin 300 of main mounting element 120 (FIG. 6A) is located in elongate cut out 502 of base portion 400 of slidable mounting assembly 122 intermediate ends 504 and 506 thereof and is also simultaneously located in elongate slot 612 of first slidable pin element 410 (FIGS. 10A-10D) intermediate rounded ends 614 and 616 thereof. It is also seen that base portion 610 of first slidable pin element 410 (FIGS. 10A-10D) is located in recess 514 formed in base portion 400 intermediate inward end 516 and outward end 518 thereof.

Correspondingly, whereas in the third operative orientation shown in FIG. 15C, pin 302 of main mounting element 120 (FIG. 6A) is located in elongate cut out 522 of base portion 400 of slidable mounting assembly 122 adjacent rounded end 524 and is also simultaneously located in elongate slot 642 of second slidable pin element 420 (FIGS. 11A-11D) adjacent rounded end 644 thereof, in the fourth operative orientation shown in FIG. 15E, pin 302 of main mounting element 120 (FIG. 6A) is located in elongate cut out 522 of base portion 400 of slidable mounting assembly 122 intermediate rounded ends 524 and 526 thereof and is also simultaneously located in elongate slot 642 of second slidable pin element 420 (FIGS. 11A-11D) intermediate rounded ends 644 and 646 thereof. Second base portion 640 of second slidable pin element 420 (FIGS. 11A-11D) is located in recess 534 formed in base portion 400 intermediate inward end 535 and outward end 536 thereof.

Whereas, as seen in FIG. 15C, particularly at enlargement D, both of downwardly directed teeth 564 and 566 lie outwardly of the valley defined between teeth 312 and 314, inward displacement of slidable mounting assembly 122 to the orientation shown in FIG. 15E causes downwardly directed tooth 564 to momentarily engage and disengage the valley defined between teeth 312 and 314 and thus twice slightly flexes the cantilevered catch tab 310. This provides a user-sensible resistance which indicates to the user that the slidable engage/disengage point of sale terminal 100 of FIGS. 1A-14C is being partially closed. In the orientation of FIG. 15E, downwardly directed tooth 564 lies inwardly of the valley defined between teeth 312 and 314 and downwardly directed tooth 566 remains outwardly of the valley defined between teeth 312 and 314.

Reference is now made to FIG. 15F, which shows full retraction of the slidable engage/disengage point of sale terminal 100 of FIGS. 1A-14C to the first operative orientation (FIGS. 15A/1 and 15A/2). This operative orientation is realized by by the user grasping the top housing portion 106 with one hand and the bottom housing portion 102 with his other hand, and sliding the slidable mounting assembly 122 relative to the bottom housing portion 102 in the direction indicated by arrow 740, which is parallel to the direction indicated by arrow 730 (FIG. 15E).

In the operative orientation shown in FIG. 15F, the slidable engage/disengage point of sale terminal 100 of FIGS. 1A-14C is in engagement with mobile communicator 101 and the adjacent surfaces 700 and 702 of the slidable top housing portion 106 and the main top housing portion 104 respectively are in touching engagement. In this operative orientation, the mobile communicator 101 is hugged in sockets 114 and 116 (FIGS. 4A-5B) of the slidable engage/disengage point of sale terminal 100 of FIGS. 1A-14C.

It is seen that ends 602 and 632 of respective cylindrical portions 600 and 630 of respective slidable pin elements 410 and 420 are in engagement with an outer edge surface of the mobile communicator 101.

It is also seen that connector 682 is inserted into operative engagement with a corresponding internal connector socket 750 of the mobile communicator 101.

It is additionally seen that base portion 610 of first slidable pin element 410 (FIGS. 10A-10D) remains located at the outward end 518 of recess 514 formed in base portion 400. Correspondingly, second base portion 640 of second slidable pin element 420 (FIGS. 11A-11D) remains located at the outward end 536 of recess 534 formed in base portion 400.

Whereas, as seen in FIG. 15E, particularly at enlargement D, downwardly directed tooth 566 lies outwardly of the valley defined between teeth 312 and 314 and downwardly directed tooth 564 is at a position inwardly of the valley defined between teeth 312 and 314, further inward displacement of inwardly-directed extension portion 560 to the first operative orientation shown in FIG. 15F, as particularly seen at enlargement D, causes downwardly directed tooth 566 to lie in the valley defined between teeth 312 and 314 and causes downwardly directed tooth 564 to lie inwardly thereof along cantilevered catch tab 310. The engagement of downwardly directed tooth 566 with the valley defined between teeth 312 and 314 slightly flexes the cantilevered catch tab 310 and provides a user-sensible resistance which indicates to the user that the slidable engage/disengage point of sale terminal 100 of FIGS. 1A-14C is being fully closed.

Reference is now made to FIG. 15G, which shows locking of the latch of the slidable engage/disengage point of sale terminal 100 of FIGS. 1A-14C, which prevents inadvertent disengagement of the mobile communicator 101 from the slidable engage/disengage point of sale terminal 100 of FIGS. 1A-14C.

As seen in FIG. 15G, particularly in enlargement B, when finger engagement protrusion 692 of slidable latch element 132 (FIGS. 14A-14C) is positioned in a locking position, latch operating lever portion 694 lies in a locking position in latch travel slot 344 blocking slidable mounting assembly latchable protrusion travel path recess 346 and thus preventing outward displacement of generally U-shaped protrusion 550 (FIG. 9B) therealong and thus prevents slidable displacement of slidable mounting assembly 122 relative to main mounting element 120, which could allow disengagement of the mobile communicator 101 from the slidable engage/disengage point of sale terminal 100 of FIGS. 1A-14C. The slidable latch element 132 may be retained in the locking position by engagement of screw 698 therewith via screw socket 168, formed in bottom housing portion 102.

Figure 15H:
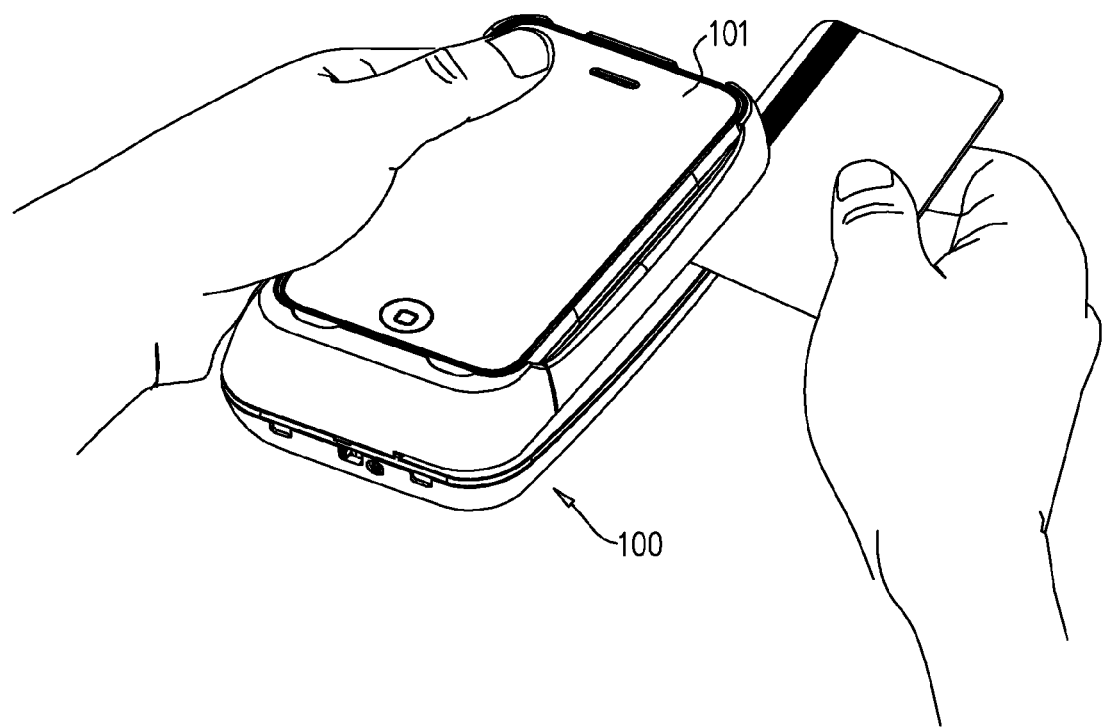
FIG. 15H is a simplified illustration of operation of the slidable engage/disengage point of sale terminal of FIGS. 1A-14C in the first operative orientation in operative engagement with a mobile communicator for magnetic card swiping.
Figure 15I:
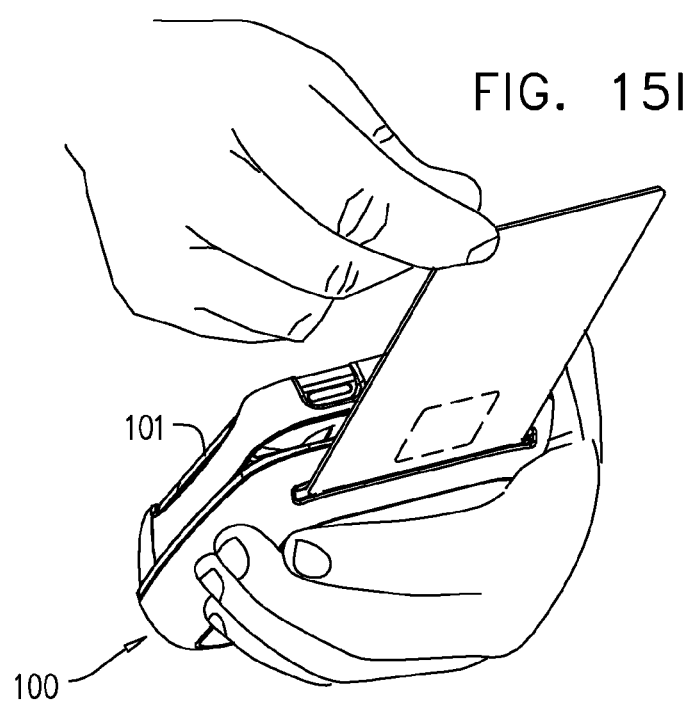
FIG. 15I is a simplified illustration of operation of the slidable engage/disengage point of sale terminal of FIGS. 1A-14C in the first operative orientation in operative engagement with a mobile communicator for smart card reading.
Figure 15J:
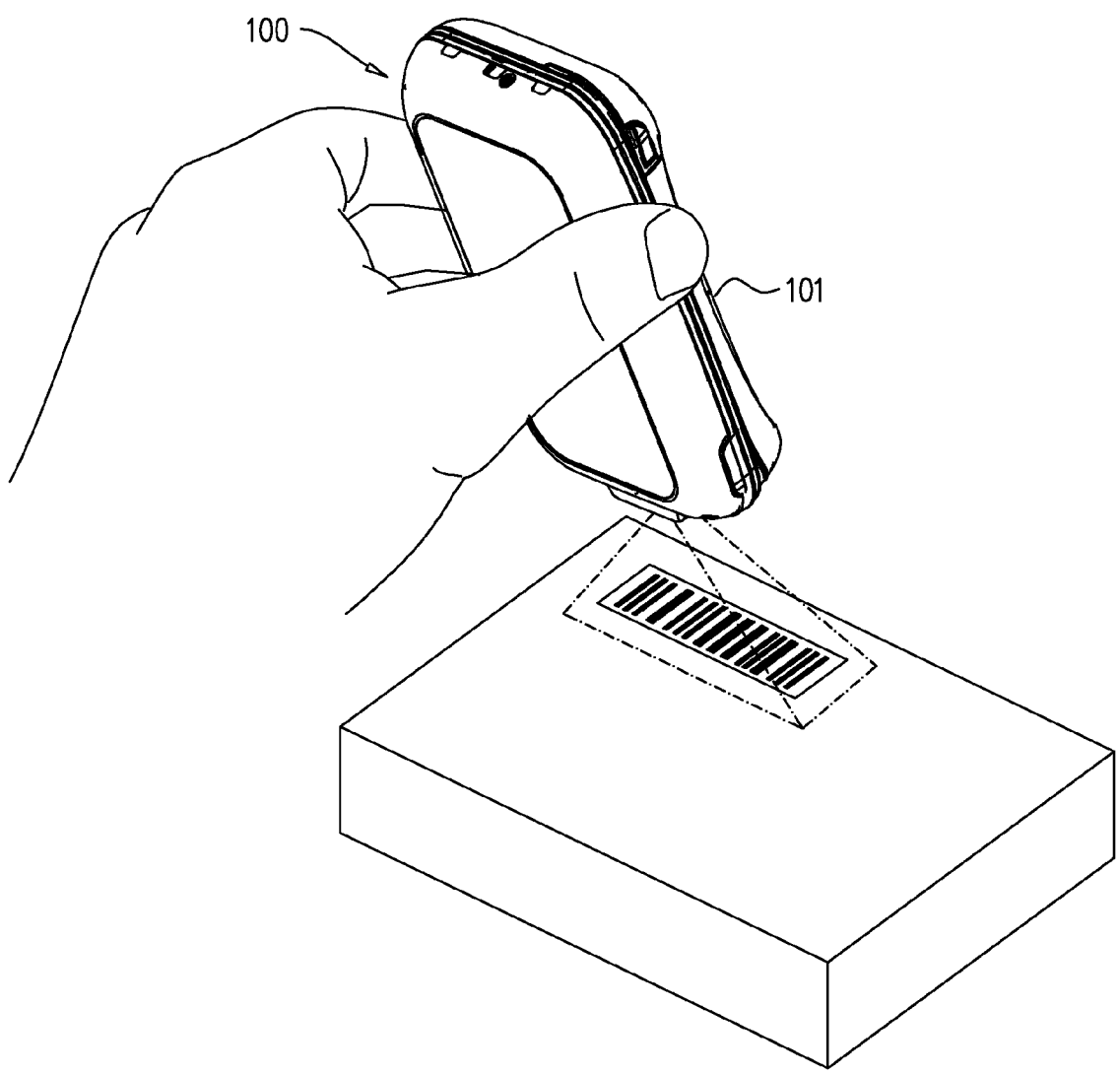
FIG. 15J is a simplified illustration of operation of the slidable engage/disengage point of sale terminal of FIGS. 1A-14C in the first operative orientation in operative engagement with a mobile communicator in a bar code reading mode of operation.

Reference is now made to FIGS. 15H and 15I, which respectively show reading of a magnetic stripe card and of a smart card by the slidable engage/disengage point of sale terminal 100 of FIGS. 1A-14C. Reference is also made to FIG. 15J which illustrates operation of optional bar code reader 136 (FIGS. 2A & 2B)

Reference is now made to FIG. 15K, which shows unlocking of the latch of the slidable engage/disengage point of sale terminal 100 of FIGS. 1A-14C, which permits disengagement of the mobile communicator 101 from the slidable engage/disengage point of sale terminal 100 of FIGS. 1A-14C.

As seen in FIG. 15K, particularly in enlargement B, when finger engagement protrusion 692 of slidable latch element 132 (FIGS. 14A-14C) is positioned in a non-locking position, latch operating lever portion 694 lies in a non-locking position in latch travel slot 344 not blocking slidable mounting assembly latchable protrusion travel path recess 346 and thus not preventing outward displacement of generally U-shaped protrusion 550 therealong and thus permitting slidable displacement of slidable mounting assembly 122 relative to main mounting element 120, which allows disengagement of the mobile communicator 101 from the slidable engage/disengage point of sale terminal 100 of FIGS. 1A-14C.

Reference is now made to FIGS. 15L/1 and 15L/2, which are together a simplified illustration of the slidable engage/disengage point of sale terminal 100 of FIGS. 1A-14C in a fifth operative orientation. As seen in FIGS. 15L/1 and 15L/2, in the fifth operative orientation, the slidable top housing portion 106 and slidable mounting assembly 122 are extended outwardly relative to main top housing portion 104 and to bottom housing portion 102 to a fifth extent, typically defining a separation between adjacent surfaces 700 and 702 of the slidable top housing portion 106 and the main top housing portion 104 respectively, typically approximately 3 mm.

It is seen from a comparison of FIGS. 15L/1 and 15L/2 with FIG. 15K that whereas in FIG. 15K, in the first operative orientation, the slidable engage/disengage point of sale terminal 100 of FIGS. 1A-14C is closed, in the fifth operative orientation of FIGS. 15L/1 and 15L/2, the slidable engage/disengage point of sale terminal 100 is partially opened by the user grasping the slidable top housing portion 106 with one hand and the bottom housing portion 102 with his other hand, and sliding the slidable mounting assembly 122 relative to the bottom housing portion 102 in the direction indicated by arrow 760.

It is a particular feature of the fifth operative orientation that the mobile communicator 101 remains fully engaged with the slidable mounting assembly 122 and is fully seated in first housing portion socket 114 of the slidable top housing portion 106, fixed to slidable mounting assembly 122 and is partially disengaged from the second housing portion socket 116 of the main top housing portion 104.

It is seen that ends 602 and 632 of respective cylindrical portions 600 and 630 of respective first and second slidable pin elements 410 and 420 remain in engagement with the outer edge surface of the mobile communicator 101 and that base portion 610 of first slidable pin element 410 (FIGS. 10A-10D) remains located at the outward end 518 of recess 514 formed in base portion 400. Correspondingly, second base portion 640 of second slidable pin element 420 (FIGS. 11A-11D) remains located at the outward end 536 of recess 534 formed in base portion 400.

It is also seen that connector 682 preferably remains fully inserted into operative engagement with corresponding internal connector socket 750 of the mobile communicator 101.

As seen further in FIG. 15L/2, particularly where slidable top housing portion 106, slidable pins elements 410 & 420, connector support element 430 and connector assembly 440 are removed, and specifically at enlargements E & F, pin 185 of main top housing portion 104 is located within elongate cut out 561 of base portion 400 intermediate rounded ends 562 and 563 thereof.

Reference is now made to FIGS. 15M/1 and 15M/2, which is a simplified illustration of the slidable engage/disengage point of sale terminal 100 of FIGS. 1A-14C in the third operative orientation in which the slidable top housing portion 106 and slidable mounting assembly 122 are extended fully outwardly relative to main top housing portion 104 and to bottom housing portion 102, typically defining a separation between adjacent surfaces 700 and 702 of the slidable top housing portion 106 and the main top housing portion 104 respectively, typically approximately 8 mm.

It is seen that connector 682 is fully disengaged from corresponding internal connector socket 750 of the mobile communicator 101.

It is seen from a comparison of FIGS. 15M/1 and 15M/2 with FIGS. 15L/1 and 15L/2 that whereas in FIGS. 15L/1 and 15L/2, in the fifth operative orientation, the slidable engage/disengage point of sale terminal 100 of FIGS. 1A-14C is partially open, in the third operative orientation of FIGS. 15M/1 and 15M/2, the slidable engage/disengage point of sale terminal 100 is fully opened by the user grasping the top housing portion 106 with one hand and the bottom housing portion 102 with his other hand, and sliding the slidable mounting assembly 122 relative to the bottom housing portion 102 in the direction indicated by arrow 770, which is identical to the direction indicated by arrow 760 (FIG. 15L/1).

Whereas in the fifth operative orientation shown in FIGS. 15L/1 and 15L/2, pin 300 of main mounting element 120 (FIG. 6A) is located in elongate cut out 502 of base portion 400 of slidable mounting assembly 122 at an intermediate location therealong and is also simultaneously located in elongate slot 612 of first slidable pin element 410 (FIGS. 10A-10D) adjacent rounded end 614 thereof, in the third operative orientation shown in FIGS. 15M/1 and 15M/2, pin 300 of main mounting element 120 (FIG. 6A) is located in elongate cut out 502 of base portion 400 of slidable mounting assembly 122 adjacent rounded end 504 and is also simultaneously located in elongate slot 612 of first slidable pin element 410 (FIGS. 10A-10D) adjacent rounded end 614 thereof.

It is also seen that base portion 610 of first slidable pin element 410 (FIGS. 10A-10D) is now located at the inward end 516 of recess 514 formed in base portion 400.

Correspondingly, whereas in the fifth operative orientation shown in FIGS. 15L/1 and 15L/2 pin 302 of main mounting element 120 (FIG. 6A) is located in elongate cut out 522 of base portion 400 of slidable mounting assembly 122 at an intermediate location therealong and is also simultaneously located in elongate slot 642 of second slidable pin element 420 (FIGS. 11A-11D) adjacent rounded end 644 thereof, in the third operative orientation shown in FIGS. 15M/1 and 15M/2, pin 302 of main mounting element 120 (FIG. 6A) is located in elongate cut out 522 of base portion 400 of slidable mounting assembly 122 adjacent end 524 thereof and is also simultaneously located in elongate slot 642 of second slidable pin element 420 (FIGS. 11A-11D) adjacent rounded end 644 thereof. Second base portion 640 of second slidable pin element 420 (FIGS. 11A-11D) is now located at the inward end 535 of recess 534 formed in base portion 400.

Whereas, as seen in FIGS. 15L/1 and 15L/2, particularly at enlargement D, downwardly directed tooth 566 lies outwardly of the valley defined between teeth 312 and 314 and downwardly directed tooth 564 is at a position inwardly of the valley defined between teeth 312 and 314, further outward displacement of slidable mounting assembly 122 causes both of downwardly directed teeth 564 and 566 to lie outwardly of the valley defined between teeth 312 and 314, as seen particularly in enlargement D in FIGS. 15M/1 and 15M/2. The momentary engagement and disengagement of downwardly directed tooth 564 respectively with and from the valley defined between teeth 312 and 314 twice slightly flexes the cantilevered catch tab 310 and provides a user-sensible resistance which indicates to the user that the slidable engage/disengage point of sale terminal 100 of FIGS. 1A-14C is being fully opened.

As further seen in FIG. 15M/2, specifically at enlargements E & F, pin 185 of main top housing portion 104 is located within elongate cut out 561 of base portion 400 adjacent rounded end 562 thereof.

From a comparison of FIG. 15M/2 with FIG. 15L/2, it is seen that whereas in the fifth operative orientation shown in FIG. 15L/2, particularly at enlargements E & F, pin 185 of main top housing portion 104 is located within elongate cut out 561 of base portion 400 intermediate rounded ends 562 and 563 thereof, in the third operative orientation shown in FIG. 15M/2, pin 185 of main top housing portion 104 is located within elongate cut out 561 of base portion 400 adjacent rounded end 562. It is appreciated that the engagement of pin 185 with elongate cut out 561 is operative to limit the extension of the slidable mounting assembly 122 relative to the remainder of the slidable engage/disengage point of sale terminal 100 of FIGS. 1A-14C along axis 108 (FIG. 1A) in a direction defined by arrows 760 and 770.

Figure 15N:
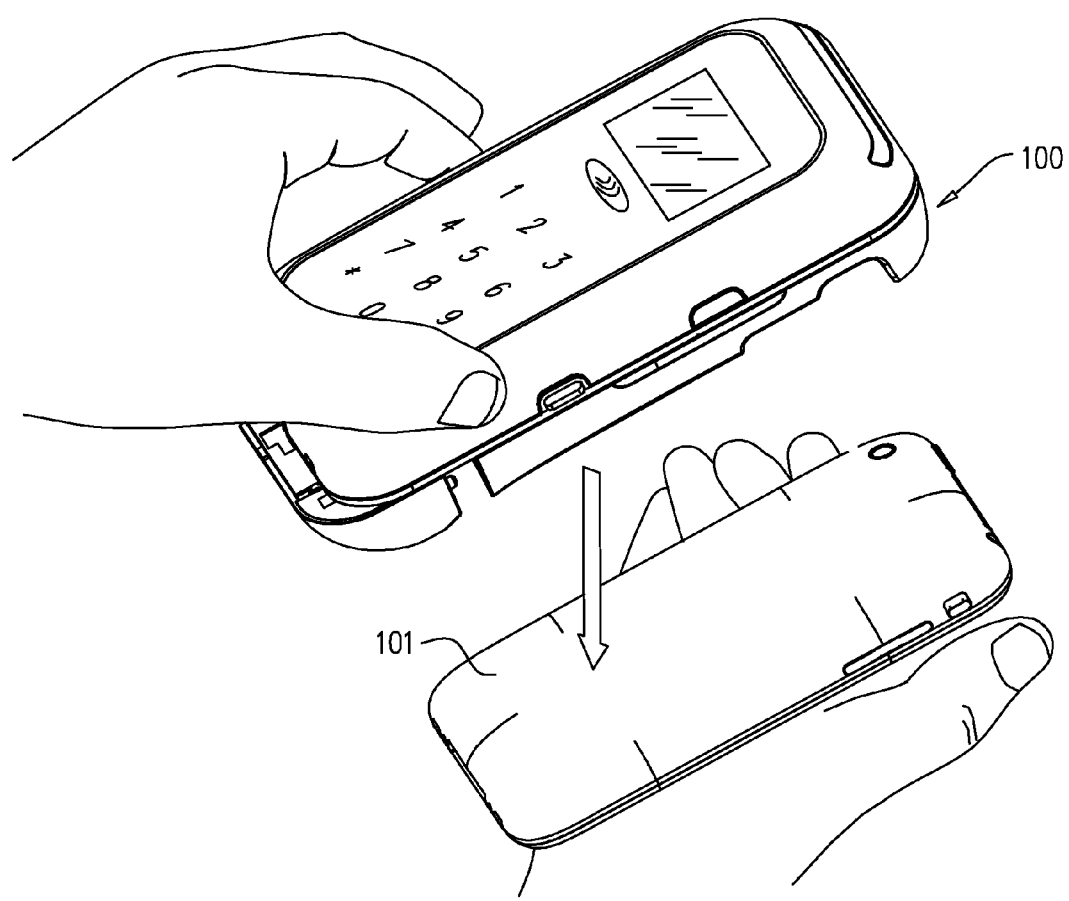
FIG. 15N is a simplified pictorial illustration of disengagement of the mobile communicator from the slidable engage/disengage point of sale terminal of FIGS. 1A-14C in the third operative orientation.

Reference is now made to FIG. 15N, which is a simplified pictorial illustration of disengagement of the mobile communicator 101 from the slidable engage/disengage point of sale terminal 100 of FIGS. 1A-14C when it is in the third operative orientation.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A point of sale terminal comprising:
a housing including at least first and second housing portions which are arranged for relative axial movement from a closed position to an open position,
said first housing portion including at least a communications interface adapted for operative communications engagement with a mobile communicator and a first housing portion socket adapted for partially surrounding said mobile communicator;
said second housing portion including a second housing portion socket adapted for partially surrounding said mobile communicator, and
said first and second housing portions being configured such that when they are arranged in said closed position said first housing portion socket and said second housing portion socket together hug said mobile communicator and prevent unwanted disengagement of said mobile communicator therefrom.

2. A point of sale terminal according to claim 1 and wherein said at least first and second housing portions are arranged for relative axial movement from said closed position to an intermediate position and from said intermediate position to said open position.

3. A point of sale terminal according to claim 2 and wherein said first and second housing portions are configured and arranged such that when they are arranged in said intermediate position said first housing portion socket hugs said mobile communicator and said second housing portion socket does not hug said mobile communicator.

4. A point of sale terminal according to claim 2 and wherein said first and second housing portions are configured and arranged such that when they are arranged in said open position neither said first housing portion socket nor said second housing portion socket hugs said mobile communicator.

5. A point of sale terminal according to claim 2 and wherein said point of sale terminal is configured to provide a user-sensible resistance, indicating to a user that said first and second housing portions are being moved from said closed position to said intermediate position.

6. A point of sale terminal according to claim 2 and wherein said point of sale terminal is configured to provide a user-sensible resistance, indicating to a user that said first and second housing portions are being moved from said intermediate position to said open position.

7. A point of sale terminal according to claim 2 and wherein said point of sale terminal is configured to provide a user-sensible resistance, indicating to a user that said first and second housing portions are being moved from said open position to said intermediate position.

8. A point of sale terminal according to claim 2 and wherein said point of sale terminal is configured to provide a user-sensible resistance, indicating to a user that said first and second housing portions are being moved from said intermediate position to said closed position.

9. A point of sale terminal according to claim 2 and wherein in said intermediate position adjacent surfaces of said first and second housing portions are separated by a first separation.

10. A point of sale terminal according to claim 9 and wherein in said open position said adjacent surfaces of said first and second housing portions are separated by a second separation, greater than said first separation.

11. A point of sale terminal according to claim 1 and wherein in said closed position adjacent surfaces of said first and second housing portions are in touching engagement.

12. A point of sale terminal according to claim 1 and wherein said communications interface includes a connector adapted for mechanical engagement with said mobile communicator.

13. A point of sale terminal according to claim 1 and wherein said communications interface includes a wireless interface adapted for wireless engagement with said mobile communicator.

14. A point of sale terminal according to claim 1 and also comprising at least one of a magnetic stripe card reader, a smart card interface, a contactless card interface and a bar code reader.

15. A point of sale terminal according to claim 1 and also comprising a slidable latch element, configured to lock said point of sale terminal is said closed position.

16. A point of sale terminal according to claim 1 and wherein said at least first and second housing portions are configured to limit said relative axial movement beyond said open position.

17. A point of sale terminal according to claim 1 and wherein said first and second housing portions are configured when in said open position to allow said mobile communicator to be placed into operative engagement with said point of sale terminal.

18. A point of sale terminal according to claim 1 and wherein said first and second housing portions are configured when in said open position to allow said mobile communicator to be removed from operative engagement with said point of sale terminal.

* * * * *